United States Patent
Simon et al.

(10) Patent No.: US 8,342,126 B2
(45) Date of Patent: Jan. 1, 2013

(54) ENHANCED PET BED SYSTEM

(75) Inventors: Arthur Louis Simon, Oakland, CA (US); Molly Elaine Mundt, San Francisco, CA (US)

(73) Assignee: Molly Mutt, LLC, Berkeley, CA (US)

( * ) Notice: Subject to any disclaimer, the term of this patent is extended or adjusted under 35 U.S.C. 154(b) by 161 days.

(21) Appl. No.: 12/708,392

(22) Filed: Feb. 18, 2010

(65) Prior Publication Data

US 2011/0197818 A1 Aug. 18, 2011

(51) Int. Cl.
*A01K 1/015* (2006.01)
*A47G 9/10* (2006.01)

(52) U.S. Cl. .................... 119/28.5; 5/641; 5/490; 5/636

(58) Field of Classification Search ................ 119/28.5; 5/630, 641, 636, 948, 489, 490, 638, 639
See application file for complete search history.

(56) References Cited

U.S. PATENT DOCUMENTS

| | | | | |
|---|---|---|---|---|
| 1,269,276 A * | 6/1918 | Harris | | 383/4 |
| 3,667,074 A * | 6/1972 | Emery | | 5/636 |
| 4,864,669 A * | 9/1989 | Jones | | 5/636 |
| 4,914,772 A * | 4/1990 | Difloe | | 5/652.1 |
| 4,924,541 A * | 5/1990 | Inagaki | | 5/652.1 |
| 4,959,880 A * | 10/1990 | Tesch | | 5/636 |
| 5,038,431 A * | 8/1991 | Burgin et al. | | 5/641 |
| 5,144,911 A * | 9/1992 | Moore et al. | | 119/28.5 |
| 5,522,105 A * | 6/1996 | Fujiwara et al. | | 5/644 |
| 5,535,468 A * | 7/1996 | Mallernee | | 5/638 |
| 5,706,535 A * | 1/1998 | Takashima | | 5/485 |
| 5,864,904 A * | 2/1999 | Rudick | | 5/640 |
| 5,918,333 A * | 7/1999 | Takashima | | 5/641 |
| 6,088,856 A * | 7/2000 | Boyer | | 5/644 |
| 6,151,733 A * | 11/2000 | Takashima | | 5/636 |
| 6,189,169 B1 * | 2/2001 | Marcotte | | 5/655 |
| 6,196,156 B1 * | 3/2001 | Denesuk et al. | | 119/28.5 |
| 6,408,468 B1 * | 6/2002 | Comfort | | 5/636 |
| 6,430,764 B1 * | 8/2002 | Peters | | 5/641 |
| 6,910,237 B2 * | 6/2005 | DiGirolamo | | 5/636 |
| 6,925,963 B2 * | 8/2005 | Duffy et al. | | 119/650 |

(Continued)

OTHER PUBLICATIONS

"36'×29' Medium Large Water resist Zipper internal pet bed cover with Taffeta fabric for dog and cat", 36'×29' Medium Large Water resist Zipper internal pet bed cover with Taffeta fabric for dog and cat; web page printed from www.amazon.com web page printed from www.amazon.com, Feb. 15, 2010.

(Continued)

*Primary Examiner* — Yvonne Abbott
(74) *Attorney, Agent, or Firm* — Michael A. Glenn; Glenn Patent Group

(57) ABSTRACT

An enhanced pet bed comprises an outer cover having an inner volume, and at least one stuff sack that is preferably porous, for placement within the inner volume of the outer cover. While the inner stuff sack may be filled with a wide variety of stuffing items, the stuff sack is preferably filled with a plurality of items supplied by the owner, and may preferably inherently include a scent that is desirable or comforting to the intended animal, e.g. the scent of a known person or animal. For embodiments having permeable stuff sacks, the entire stuff sack assembly may preferably be laundered, e.g. washed and dried, as a unit, i.e. with the stuffing retained. Since the enhanced pet beds are typically provided without stuffing, the intended waste footprint of the is purchased product is significantly less than that of a conventional bed.

27 Claims, 14 Drawing Sheets

U.S. PATENT DOCUMENTS

| | | | |
|---|---|---|---|
| 6,928,678 B1 * | 8/2005 | Chang | 5/636 |
| 7,051,389 B2 * | 5/2006 | Wassilefky | 5/636 |
| 7,089,617 B1 * | 8/2006 | Lauro | 5/636 |
| 7,111,347 B1 * | 9/2006 | Cottrell | 5/655 |
| 7,146,663 B2 * | 12/2006 | Brown et al. | 5/636 |
| 7,523,513 B2 * | 4/2009 | Waters et al. | 5/502 |
| 7,735,169 B2 * | 6/2010 | Wassilefsky | 5/636 |
| 7,810,192 B2 * | 10/2010 | Fujita et al. | 5/636 |
| 8,127,382 B1 * | 3/2012 | Plascencia et al. | 5/639 |
| 2006/0060147 A1 * | 3/2006 | Appelhans | 119/28.5 |
| 2006/0112487 A1 * | 6/2006 | Taylor | 5/490 |
| 2006/0162664 A1 * | 7/2006 | Baer | 119/28.5 |
| 2007/0017031 A1 * | 1/2007 | Kaplan | 5/636 |
| 2007/0289537 A1 * | 12/2007 | Duncan | 119/28.5 |
| 2008/0022934 A1 * | 1/2008 | Kruczek | 119/28.5 |
| 2008/0295775 A1 * | 12/2008 | Arvanites | 119/28.5 |
| 2009/0077750 A1 * | 3/2009 | Jarvis | 5/639 |
| 2009/0151078 A1 * | 6/2009 | Soehner | 5/639 |
| 2010/0077962 A1 * | 4/2010 | Arvanites | 119/28.5 |

OTHER PUBLICATIONS

"petLINENS Dog Bed Waterproof/breathable Dog Bed Liner", pp. 1-2 of 4 printed from: www.amazon.com on Feb. 15, 2010, 45'×36'×6' Rectangular Cushion Saver;, Feb. 15, 2010, pp. 1-2.

* cited by examiner

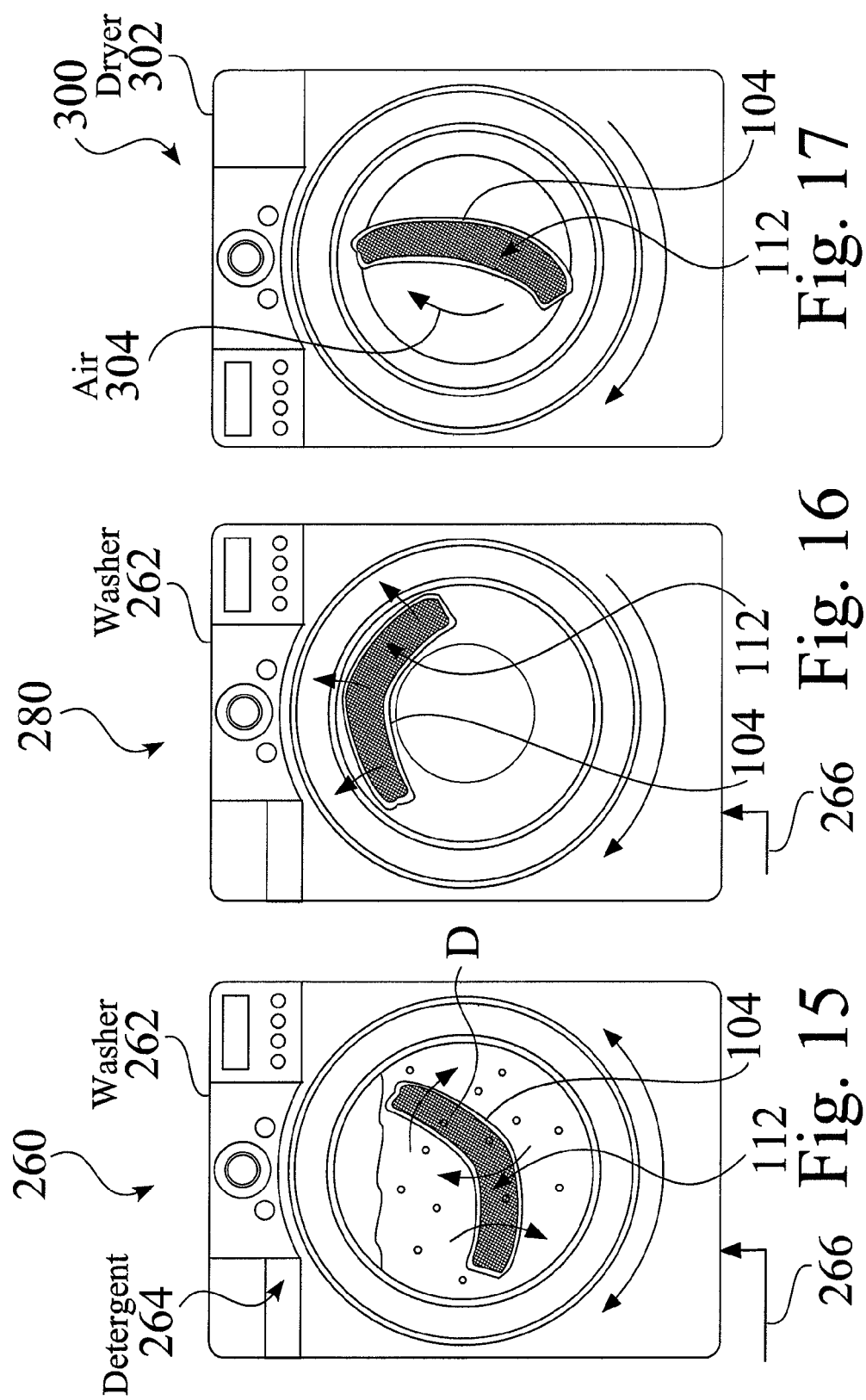

ENHANCED PET BED SYSTEM

FIELD OF THE INVENTION

The invention relates to the field of pet beds. More particularly, the invention relates to improved pet bed structures and processes.

BACKGROUND OF THE INVENTION

As noted in the 2007 edition of *U.S. Pet Ownership & Demographics*, there are currently more than 72 million pet dogs in the United States, and nearly 82 million pet cats. As of 2006, the same publication estimated that nearly half of pet owners considered their pets to be family members.

Pet owners often attempt to provide bedding for their pets, typically comprising some sort of upholstered cushion, either as a stand-alone pet bed, or as a bed to be placed within a crate or basket structure.

Pets, such as domesticated dogs or cats, are often hesitant to accept a new pet bed, often because they desire to be as close as possible to their human companions, or to other pets. Pets often prefer to jump up on familiar furniture and beds, rather than accept a new pet bed, which does not have an imprint of their owner or of other animals within their family. This anxiety for the intended pet is worsened when the pet is coaxed away from prior accommodations, and is forced to accept their new pet bed.

Currently available pet beds typically comprise an outer fabric cover, and an inner mattress, such as comprising a cloth liner having stuffing, or a foam rubber cushion. The stuffing within the inner mattress may comprise a wide variety of natural or synthetic material, such as but not limited to cotton, cedar shavings, or foam rubber.

Such pet beds are typically sold as complete assemblies, often at a low price through big box stores or discount pet supply stores. Companies that manufacture such pet beds may typically manufacture and market a variety of sizes, e.g. for cats and/or small medium, and large dogs. As well, such companies may provide a variety of bed shapes, such as for square, rectangular and/or circular beds, and may even provide bed shapes that emulate human furniture, e.g. such as including bolstered backs or sides to look like an armchair or a couch.

Pet owners are often required to remove the outer cover for washing, particularly when the dog bed becomes extremely soiled and/or smells bad.

While some stuffing that is provided within currently available pet beds may be somewhat cleanable, owners are often reluctant to even attempt to completely disassemble the bed and remove the stuffing or pad for cleaning, such as due to the unpleasantness of such a task, and the knowledge that an entire pet bed is often inexpensive and readily available.

It would therefore be advantageous to provide a bedding system that is readily cleanable, without requiring removal of stuffing from the bed. The development of such a system would be a major technological breakthrough. It would also be advantageous to provide a pet bed system that is more readily acceptable for the intended animal.

In contrast to domestic manufacturers of beds for people, that provide reasonably conventional sizing, e.g. such as for twin/single; double/full, Queen, King, and California King size beds, there is no consistent standardization between manufacturers of pet beds.

Since pet beds are not available in standard sizes, and are often marketed and/or understood to be used for a limited time, owners will often throw away the entire bed once the bed is unacceptably soiled or damaged, resulting in a large volume and mass of discarded material that typically ends up in a landfill.

While replacement covers for pet beds are available, such as through Internet-based businesses, the cost is often as much or more than the cost of buying a new pet bed. As well, the lack of standard sizing in pet beds often results in replacement covers that don't fit well over the inner mattress element.

Since conventional dog beds are sold as non-standard complete units, the owner is typically forced to launder the soiled cover as soon as possible, which is inconvenient at best. If the pet is not required to be confined for the time the cover is being laundered, the pet owner/handler may at least have some time with which to clean and reinstall the cover. Often, such as during times of inclement weather, or at other times when the pet is required to be confined, there is an almost immediate need to provide a bed for the animal. Therefore, the time to clean the cover becomes a major inconvenience, and may cause anxiety for the owner/handler as well as the animal.

Conventional inner covers are typically comprised of inexpensive materials, and are prestuffed with a wide variety of materials, such as polyester filling, kapok, cotton wadding, foam rubber, or expanded polystyrene beads. Some inner covers are sealed or stitched shut, wherein there is no access to remove the stuffing. While some conventional inner covers may provide a zipper or other means by which the stuffing material was initially stuffed into the inner cover, the stuffing material is often not cleanable or serviceable.

It would therefore be further advantageous to provide a structure by which the internal stuffing is conveniently cleanable for the pet owner. The development of such a structure would constitute a significant technological advance.

In addition, it would be advantageous to provide a pet bed system that minimizes waste volume of that is attributable the pet bed and/or the pet owner, such as by providing a mechanism that encourages reuse or upcycling of other items belonging to the owner that are otherwise considered to be disposable. The development of such a system would help to address the ecological concerns of our planet.

SUMMARY OF THE INVENTION

An enhanced pet bed comprises an outer cover having a defined accessible inner volume, and at least one enhanced stuff sack that is preferably porous or otherwise permeable, e.g. comprising mesh fabric, for placement within the inner volume of the outer cover. While the enhanced inner stuff sack may be filled with a wide variety of stuffing items, the stuff sack is preferably at least partially filled with a plurality of items supplied by the owner or handler of the pet, such as but not limited to clothing, blankets, pillows, and stuffed toys, which may preferably inherently include a scent that is desirable or comforting to the intended animal, e.g. the scent of a known person or animal. The enhanced pet bed may preferably comprise non-gusseted or gusseted construction. For embodiments having permeable stuff sacks, such as filled with owner-supplied clothes and blankets, the entire stuff sack assembly may preferably be laundered, e.g. washed and dried, as a unit, i.e. with the stuffing retained in situ. Since enhanced pet beds are typically provided without stuffing, the size of the marketed product is significantly less than that of a conventional pet bed, and as such, may be economically distributed and sold though a wider variety of channels, and may be more easily purchased and transported by the consumer. Furthermore, the waste footprint of the purchased product is significantly less than that of a conventional bed. In addition, since the use of existing clothing and bedding items is encouraged, the pet owners typically stuff the enhanced stuff sack with items that would often be discarded as well, thus upcycling (recycling without further processing), further reducing the resultant waste footprint, while simultaneously providing increased room within their living area.

BRIEF DESCRIPTION OF THE DRAWINGS

FIG. 15 is a partial cutaway view of a laundry wash cycle for a stuffed permeable stuff sack;

FIG. 16 is a partial cutaway view of a laundry spin cycle for a stuffed permeable stuff sack;

FIG. 17 is a partial cutaway view of a laundry drying cycle for a stuffed permeable stuff sack;

DETAILED DESCRIPTION OF PREFERRED EMBODIMENTS

Figure 1:
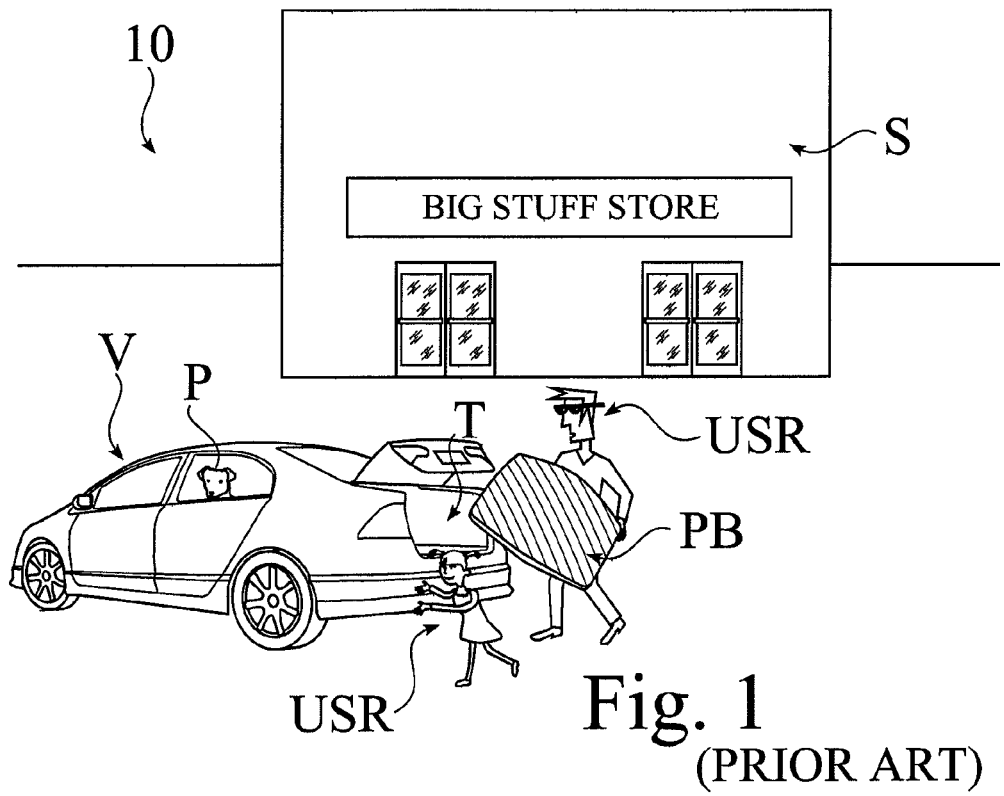
FIG. 1 shows the acquisition of a conventional pet bed.

FIG. 1 shows the acquisition 10 of a conventional pet bed PB. While conventional pet beds PB may be purchased through a wide variety of sources, such as through local pet stores, mail order catalogs, and/or Internet suppliers, an increasing number of such pet beds PB are often sold through big box stores, e.g. Costco Wholesale Corporation, of Issaquah, Wash., or discount pet supply stores, such as but not limited to Petco Animal Supplies, Inc. of San Diego, Calif. or PetSmart, Inc. of Phoenix, Ariz., which can sell pet beds inexpensively, due to their purchasing power, transportation costs, and business structures.

As seen in FIG. 1, pet owners or handlers USR typically use a motor vehicle V, having limited cargo space T, to visit a store S and purchase a conventional pet bed PB for their pet P.

Figure 2:
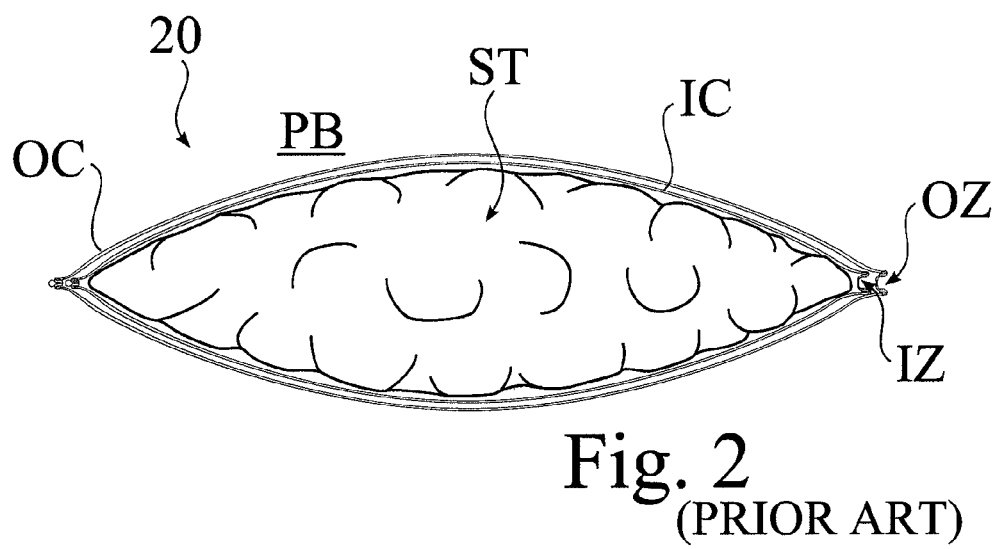
FIG. 2 is a schematic partial cutaway view of a conventional pet bed.

FIG. 2 is a schematic partial cutaway view 20 of a conventional pet bed PB. An outer cover OC typically comprises upper and lower cloth panels, and may have non-gusseted or gusseted construction. The outer cover OC typically comprises a mechanism OZ, such as a zipper, a fold of fabric, ties, a hoof and loop structure, or buttons and mating holes, for opening and closing the outer cover OC to gain access to the interior. The interior of the outer cover OC is then filled with stuffing ST, such as but not limited polyester fill, kapok, cotton wadding, foam rubber, or expanded polystyrene beads. In some conventional pet beds PB, the stuffing ST may be stuffed within an inner cover IC, such as comprising thin muslin fabric. While some inner covers IC may be fully sewn, preventing access to the stuffing ST, other inner covers may provide a mechanism IZ for opening and closing the inner cover.

Pet beds PB often become soiled during even regular use, being subjected to a wide variety of contaminants D, such as but not limited to any of soil, dirt, pet hair or fur, pet dander, dirt, grease, fleas, flea dirt, flea eggs, food, saliva, urine, and feces. This often requires that the pet owner or handler USR service the pet bed PB, such as at the very least to clean the exterior surface of the outer cover OC, e.g. such as with a vacuum, an adhesive fabric roller, a dampened sponge, baby wipes, and/or a lint removal brush.

Figure 3:
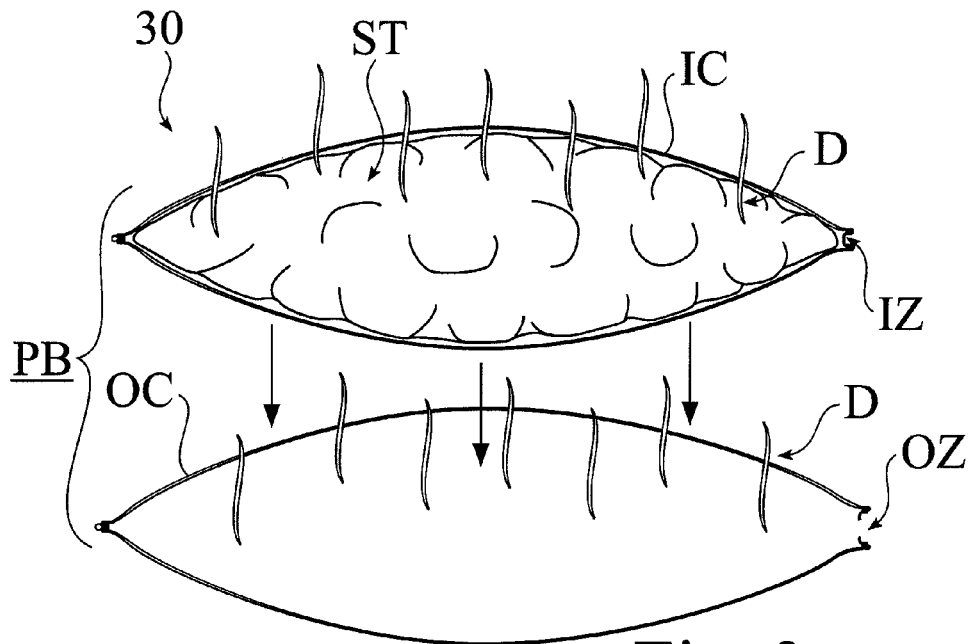
FIG. 3 shows a the removal of an outer cover of a conventional dog bed for laundering.

While minor cleaning may remedy a lightly soiled pet bed PB, more thorough cleaning is often required. FIG. 3 shows the removal 30 of an outer cover OC of a conventional pet bed PB for laundering. While the inner cover IC, and/or the stuffing ST of a conventional pet bed PB may separably be cleanable, owners are often reluctant to remove the stuffing ST and clean the inner cover IC or the stuffing ST, such as due to any of their desire to avoid close contact with the associated dirt and stench D, their knowledge that an entire bed assembly PB may be purchased inexpensively, and/or their concern that the stuffing ST may come apart in the wash.

Figure 4:
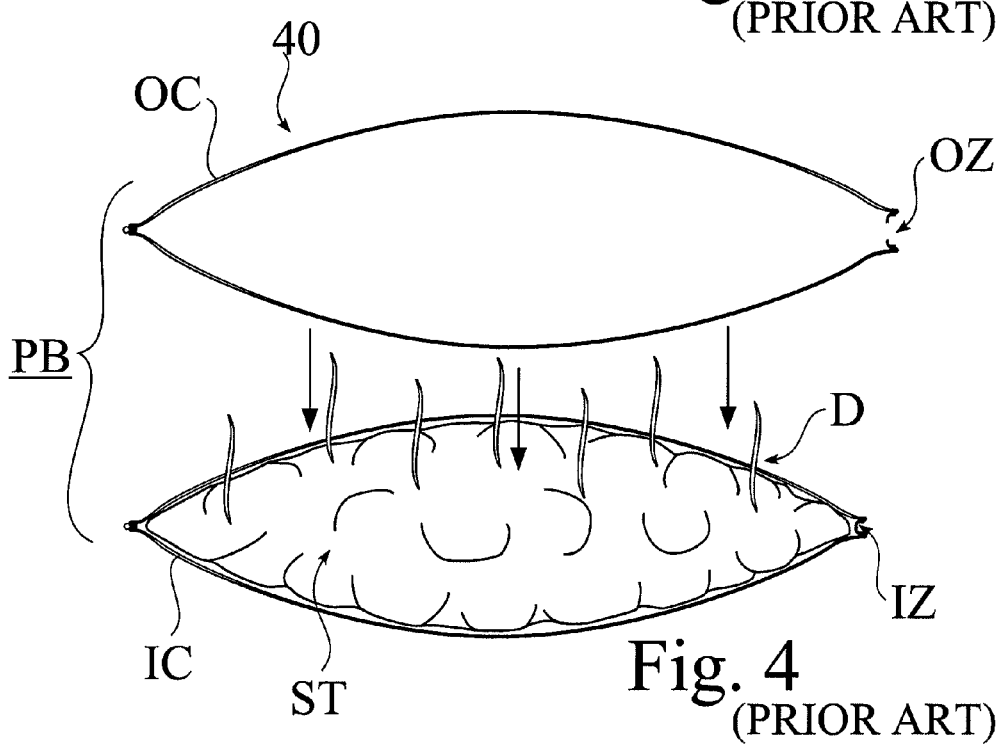
FIG. 4 shows the reinstallation of a stuffed conventional Inner cover within a laundered conventional outer cover.

As most pet owners USR only possess the original outer cover OC for a particular pet bed PB, the owners USR are typically forced to wash and dry the soiled outer cover as soon a possible, so the pet bed PB can be reused for the intended pet P. FIG. 4 shows the reinstallation 40 of a stuffed conventional inner cover IC, which is often still soiled, within a laundered or spare conventional outer cover OC.

While some owners USRs may conceivably purchase a spare outer cover OC for such use, such spare outer covers OC are often not as readily available as an entire conventional pet bed PB, often cost as much or more than an entire conventional pet bed PB, and are also often marketed through different sales channels, e.g. smaller businesses. Therefore, most owners USRs don't even consider looking for a replacement cover OC. As well, due to the lack of standardization between manufacturers, available replacement outer covers OC often do not fit correctly, and many stores, particularly smaller stores, do not stock sufficient inventory to provide replacement outer covers OC for a wide variety of pet bed sizes.

When a soiled stuffed inner cover IC is placed within a laundered or spare conventional outer cover OC, the owner's satisfaction is often short lived, as a large portion of the soil and stench D has not been remedied. The laundered or spare conventional outer cover OC is thereafter subjected to contamination from both sides, wherein the owner USR must then repeat the process before long. Furthermore, the stuffing ST, as well as the inner cover IC, often degrades through use, particularly without cleaning.

Figure 5:
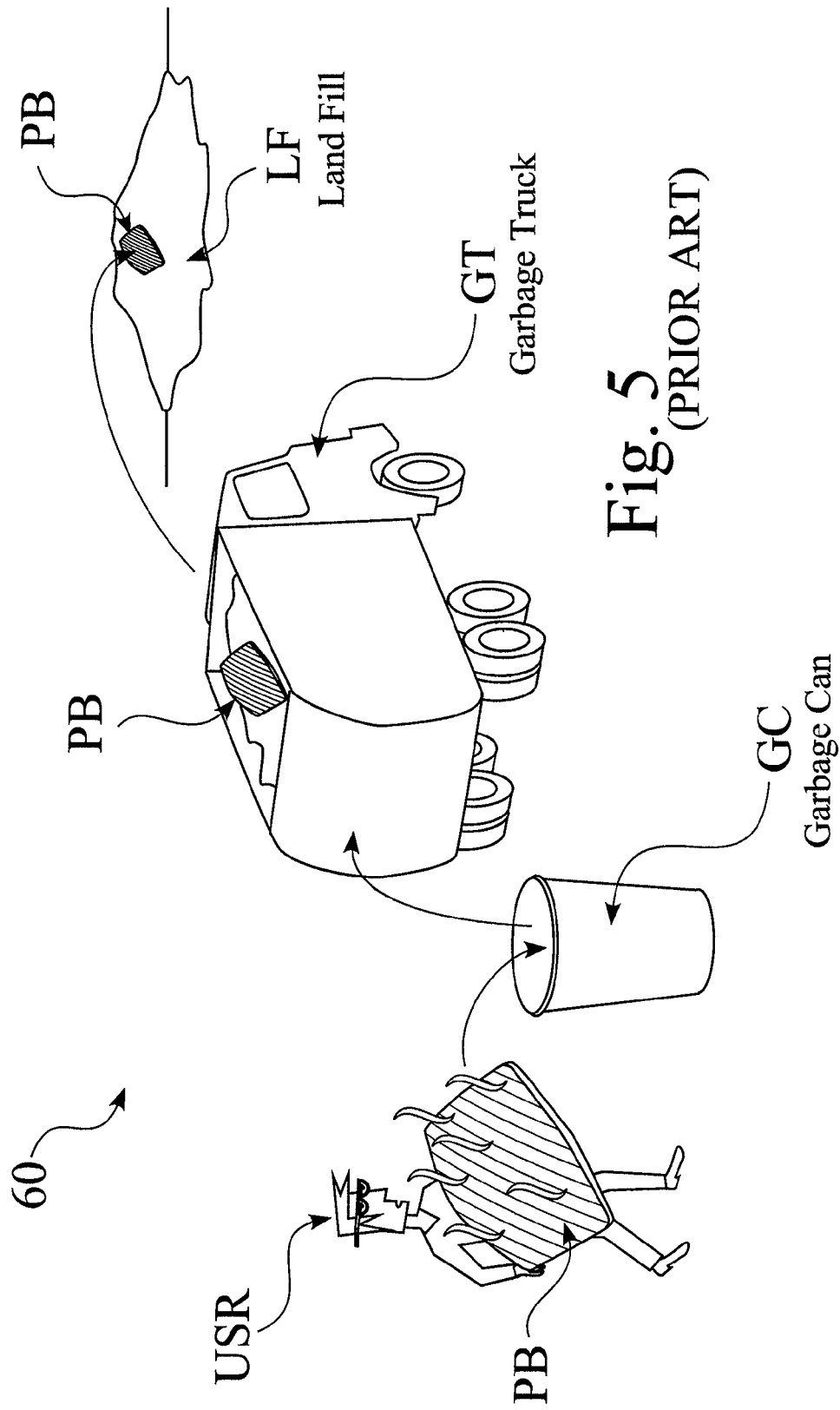
FIG. 5 is an exemplary diagram showing the disposal of a conventional pet bed.

FIG. 5 is an exemplary diagram showing the disposal 60 of a conventional pet bed PB. Rather than continually dealing with the spoiled pet bed PB with such incomplete cleaning. Many owners USRs often decide to completely replace the entire conventional pet bed PB, while throwing away the prior soiled pet bed PB. As seen in FIG. 5, an owner USR may typically leave the entire soiled pet bed PB in or on their trash can GC, which is then picked up by a garbage truck GT, and is transported to a landfill LF, without recycling or reuse of any portion of the pet bed PB.

Figure 6:
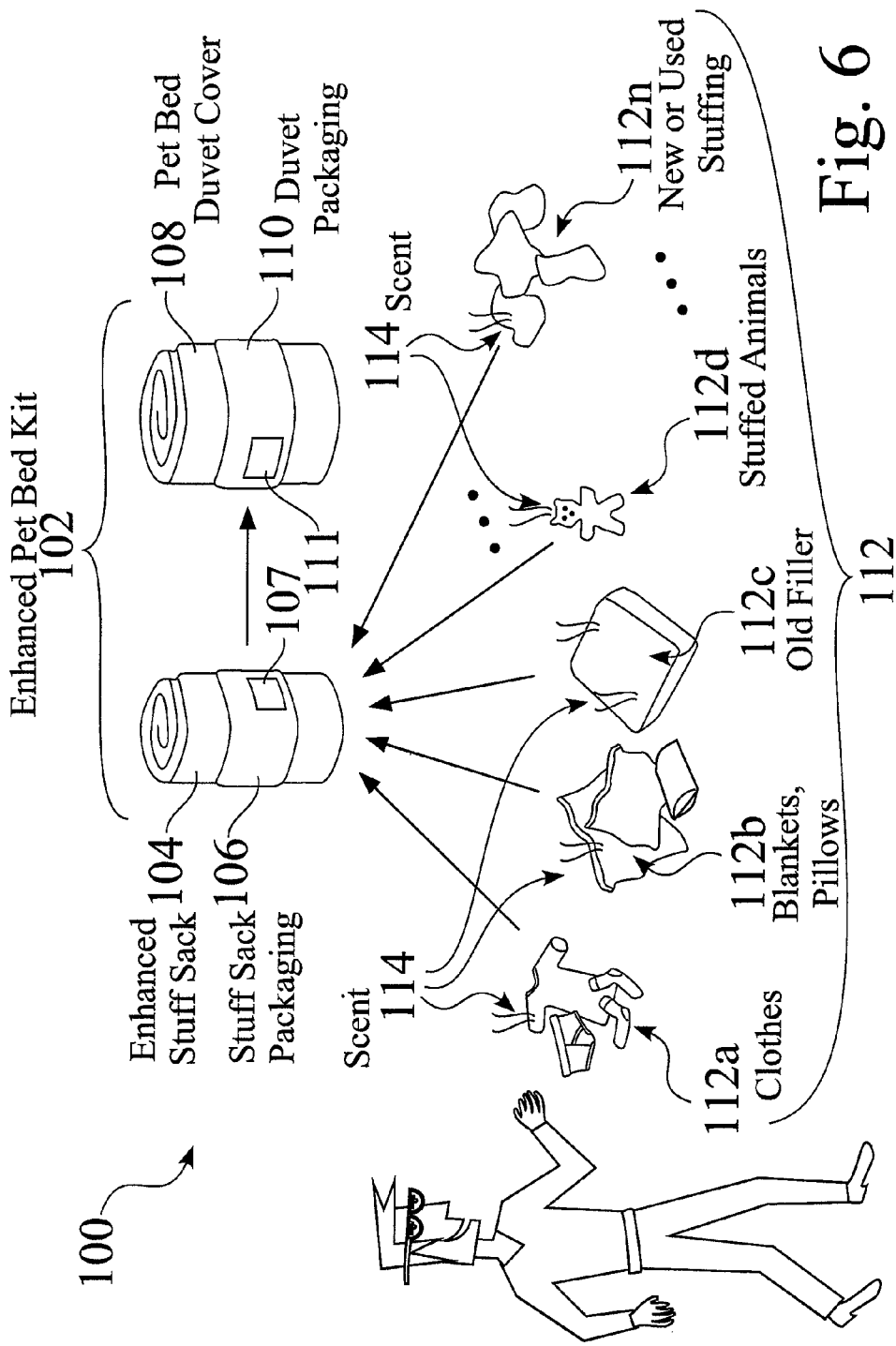
FIG. 6 is an expanded schematic assembly view of an enhanced pet bed, using owner-supplied stuffing materials.
Figure 7:
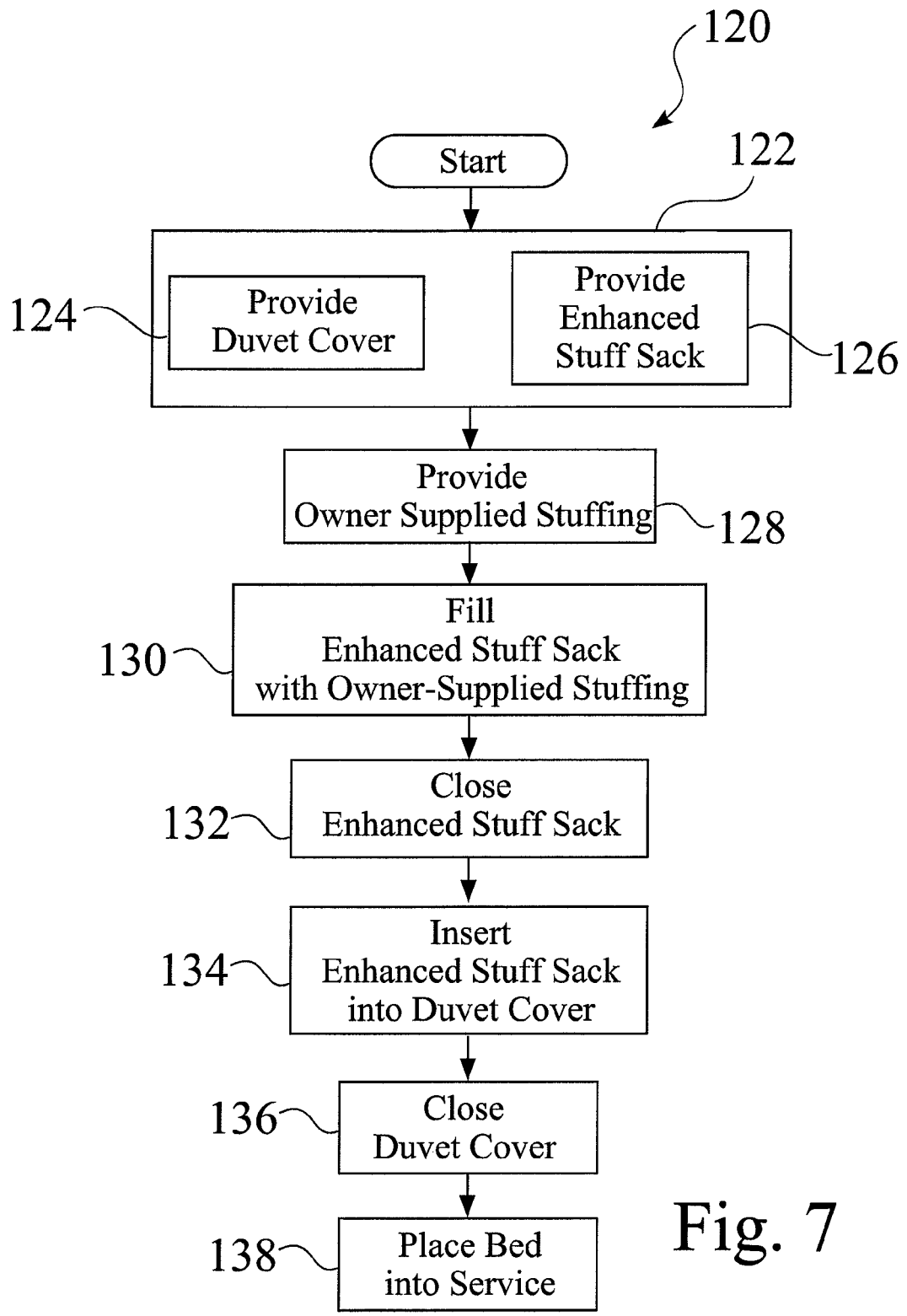
FIG. 7 is a flow diagram of a process for assembling an enhanced pet bed having owner-supplied stuffing materials.

Enhanced Pet Bed System. FIG. 6 is an expanded schematic assembly view of an exemplary enhanced pet bed system 100, such as comprising an enhanced pet bed kit 102, and using owner-supplied stuffing materials 112. FIG. 7 is a flow diagram of a process for assembling 120 an enhanced pet bed 100 having owner supplied stuffing materials 112.

As seen in FIG. 6, the exemplary enhanced pet be kit 102 comprises an enhanced stuff sack 104 and a pet bed duvet cover 108, wherein the enhanced stuff sack 104 is preferably sized to generally conform to the interior volume 143 of the pet bed duvet cover 108. As also seen in FIG. 6, the enhanced stuff sack 104 may be compactly packaged, such as with packaging 106. The pet bed duvet cover 108 may similarly compactly packaged, such as with packaging 110. The exemplary enhanced pet bed kit 102 may be packaged separately, or may alternately packaged together, e.g. as a do-it-yourself (DIY) kit 102. The associated packaging 106 and/or 110 may typically include labeling and/or instructions 107,111, or may include a web site and/or telephone contact number, that instruct the user USR how to best construct the enhanced pet bed 100, and/or how to service the enhanced pet bed 100.

The owner USR may stuff the enhanced stuff sack 104 with a wide variety of stuffing 112, such as but not limited to clothes 112a, blankets and/or pillows 112b, prior pet bed filler 112c, stuffed animals 112d, and/or new or used stuffing material 112n. The process 120 of assembling an enhanced pet bed 100 commences by providing 124, 126 the pet bed duvet cover 108 and enhanced stuff sack 104, such as individually, or 122, as a packaged DIY kit 102.

The owner USR then provides 128 their own stuffing 112, which may preferably comprise any of a wide variety of materials 112 that may be cluttering up their residence, such as any old, outgrown, damaged or stained clothes 112a, and/or blankets or pillows 112b. The owner may even use prior pet bed filler 112c, used stuffed animals 112d such as belong to the pet or a child, end/or new or used stuffing material 112n. The enhanced stuff sack 104 for the enhanced pet bed system 100 preferably comprises one or more porous sections 146, e.g. 146a or 146b (FIG. 8, FIG. 9), which allows cleaning of the stuffing materials 112.

The enhanced stuff sack 104 is then filled 130 with the supplied materials 112, preferably full enough to generally conform the enhanced stuff sack 104 to the shape of the interior 143 of the pet bed duvet cover 108. As the top and bottom of the enhanced pet bed 100 is generally larger in size than the height, the enhanced stuff sack 104 may preferably be stuffed to provide a generally convex shape on either the top and/or bottom of the enhanced pet bed 100. Since the owner USR may provide a wide variety of materials 112, e.g. 112a-112n, the owner may preferably arrange the various materials 112 to provide soft or firm areas as desired, such as by using a non-homogeneous arrangement of materials. For example, since many pets P prefer to nest within a sleeping area, an owner USR may stuff a central region of the enhanced stuff sack with softer and/or more compressible materials 112, wherein the pet P can settle comfortably and stay warm from the surrounding higher regions of the enhanced pet bed 100. Similarly, for pets P that prefer to a lumpy sleeping area, the owner USR may preferably arrange the various materials 112 to provide a lumpy non-homogeneous profile across the bed 100.

Once the enhanced stuff sack 104 is sufficiently full of material 112, the owner USR then closes 132 the enhanced stuff sack 104, inserts 134 the closed filled enhanced stuff sack 104 within the interior volume 143 (FIG. 8) of the pet bed duvet cover 108, and closes 136 the opening 142 of the duvet cover 108. In some embodiments 100, the user USR may insert 134 the empty enhanced stuff sack 104 within the interior volume 143 of the pet bed duvet cover 108 before filling 130 and closing 132. Once the bed 100 is filled 132 and closed 132,136, the bed may be placed 138 into service.

The use of existing owner-supplied materials 112 is preferably encouraged, and is also desirable for the pets P. When the pet owners USR stuff at least a portion of the enhanced stuff sack 104 with items 112 that would otherwise eventually be discarded, the owners USR typically experience another advantage, that of increased room within their living area, such as regaining space within their closets, dressers, wardrobes, blanket chests and/or armoires. Furthermore, when the enhanced stuff sack 104 is at least partially stuffed with items 112 that would otherwise eventually be discarded, those items 112 do not have meet the same fate of conventional pet beds PB, i.e. sitting in a landfill LF, and are thus repurposed or upcycled, i.e. recycled without further processing, since they are transformed into something of greater use and value, as material 112 within the enhanced pet bed 100.

While the many embodiments of the enhanced pet bed 100 are packaged to be filled with owner-supplied stuffing 112, some alternate embodiments of the enhanced pet bed 100 are provided as pre-stuffed assemblies 100, i.e. with stuffing 112, which still provide enhanced serviceability over conventional pet beds PB.

Figure 8:
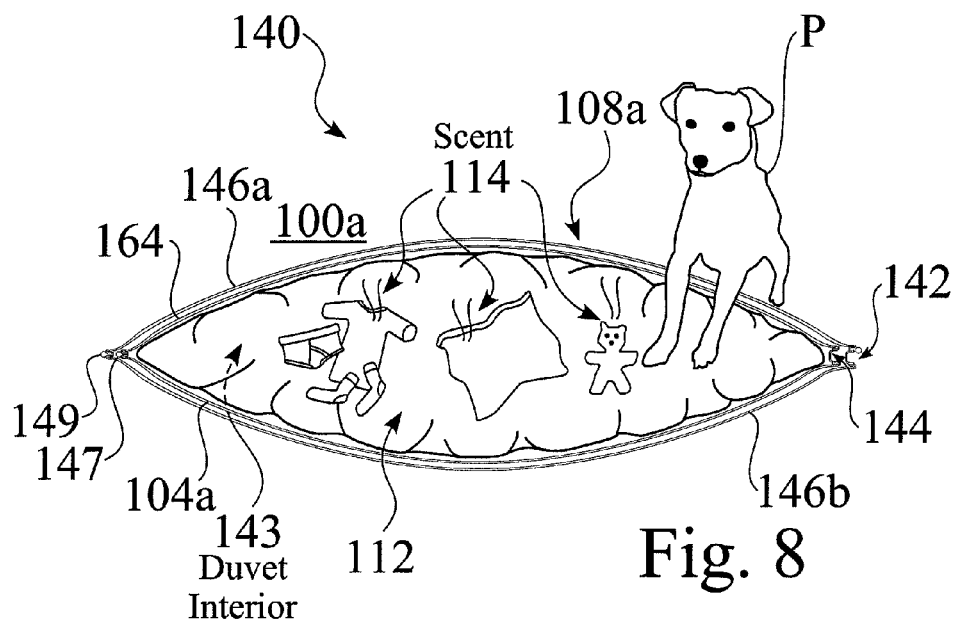
FIG. 8 is a schematic diagram of an exemplary assembled enhanced pet bed having non-gusseted construction.
Figure 10:
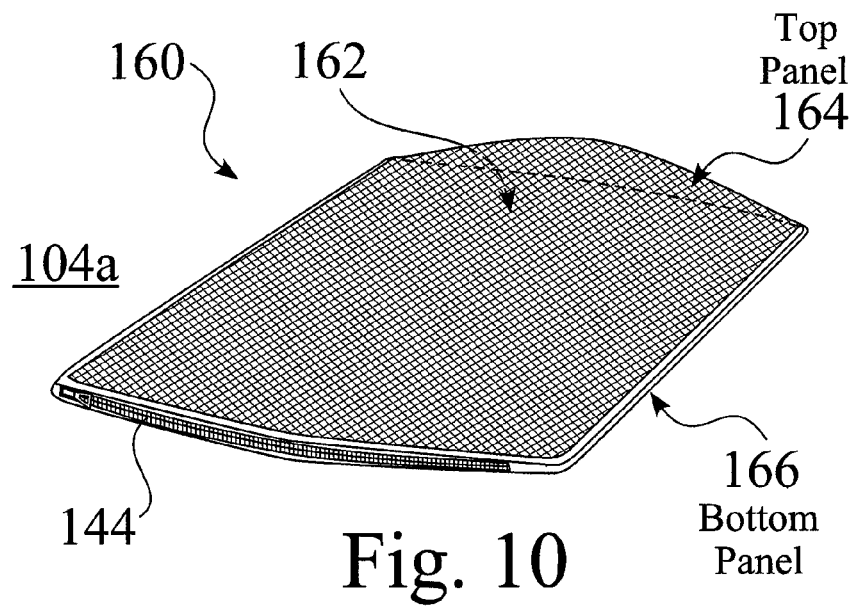
FIG. 10 is a schematic diagram of an exemplary permeable stuff sack for an enhanced pet bed having non-gusseted construction.

FIG. 8 is a schematic diagram 140 of an exemplary assembled enhanced pet bed 100a having non-gusseted construction. The exemplary non-gusseted enhanced stuff sack 104a seen in FIG. 8 typically comprises an upper section or panel 164 (FIG. 10) that is sewn or otherwise fastened about a portion of it's periphery, e.g. three of four sides of a rectangular panel 164, to a lower section or panel 166 (FIG. 10). The enhanced stuff sack 104a also comprises a closure 144, such as but not limited to a zipper, buttons, ties, or a hook and loop structure 144. The exemplary non-gusseted duvet cover 108a seen in FIG. 8 typically comprises an upper section or panel 146a that is sewn or otherwise fastened about a portion of it's periphery, e.g. three of four sides of a rectangular panel 146a, to a lower section or panel 146b. The pet bed duvet cover 108a also comprises a closure 142, such as but not limited to a zipper, buttons, ties, or a hook and loop structure 142.

Figure 9:
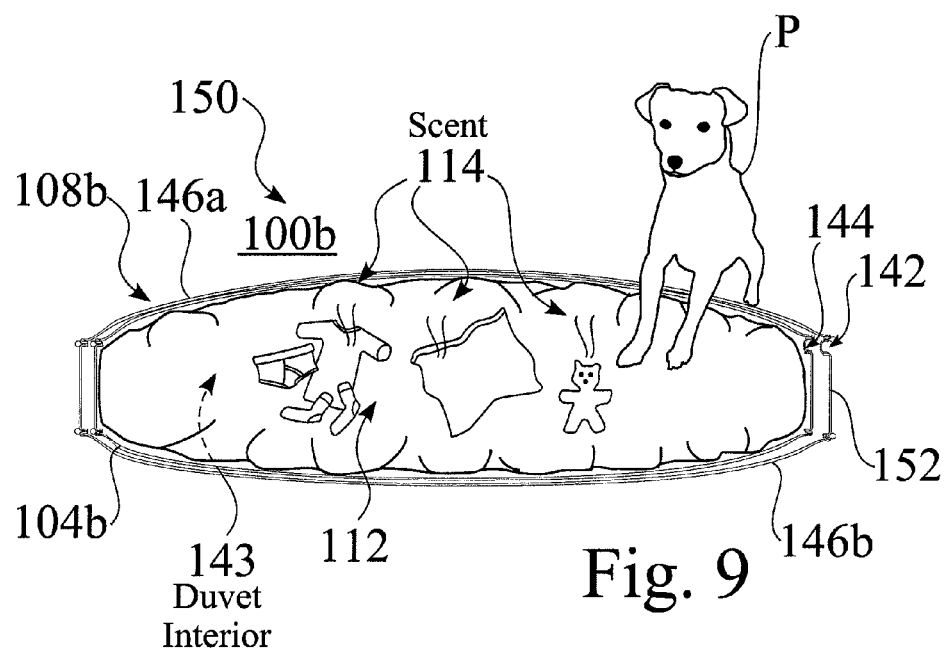
FIG. 9 is a schematic diagram of an exemplary assembled enhanced pet bed having gusseted construction.
Figure 11:
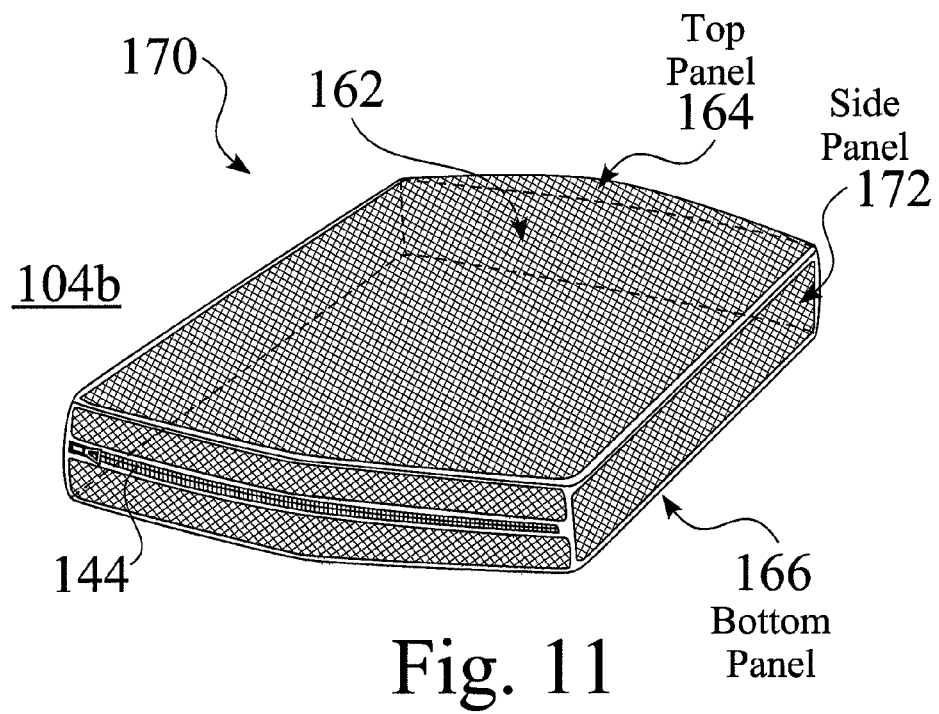
FIG. 11 is a schematic diagram of an exemplary permeable stuff sack for an enhanced pet bed having gusseted construction.

FIG. 9 is a schematic diagram 150 of an exemplary assembled enhanced pet bed 100b having gusseted construction. The exemplary gusseted enhanced stuff sack 104b seen in FIG. 9 typically comprises an upper section or panel 164 (FIG. 11) that is sewn or otherwise fastened about a portion of it's periphery, e.g. three of four sides of a rectangular panel 164, to one or more side panels 172, which are sewn or otherwise fastened to a lower section or panel 166 (FIG. 11).

The enhanced stuff sack 104b also comprises a closure 144, such as but not limited to a zipper, a drawstring, buttons, ties, or a hook and loop structure, e.g. Velcro™. The closure 144 may preferably be located at any spot on the panels 162,164, and/or 174, as desired, such as but not limited to an upper edge, a middle region, or a lower edge of one of the side panels 174.

The exemplary gusseted duvet cover 108b seen in FIG. 9 typically comprises an upper section or panel 146a that is sewn or otherwise fastened about a portion of it's periphery, e.g. three of four sides of a rectangular panel 146a, to one or more side gusset panels 152, which are sewn or otherwise fastened to a lower section or panel 146b.

The gusseted pet bed duvet cover 108b also comprises a closure 142, such as but not limited to a zipper, a drawstring, buttons, ties, or a hook and loop structure, e.g. Velcro™. The closure 142 may preferably be located at any spot on the panels 146a, 146b, 152, as desired, such as but not limited to an upper edge, a middle region, or a lower edge of one of the side panels 152.

As seen in FIG. 8 and FIG. 9, the enhanced pet bed system 100, e.g. 100a, 100b, may preferably be at least partially filled with user supplied materials 112 that have a residual scent 114 of a person or animal that is familiar to the intended pet P.

The enhanced stuff sack 104 for the enhanced pet bed system 100 preferably comprises one or more porous sections 164,166, and or 172 (FIG. 10, FIG. 11), wherein the stuffing materials 112 may be laundered, i.e. washed and dried, in situ.

FIG. 10 is a schematic diagram 160 of an exemplary permeable stuff sack 104a for an enhanced pet bed 100a having non-gusseted construction. FIG. 11 is a schematic diagram 170 of an exemplary permeable stuff sack 104b for an enhanced pet bed 100b having gusseted construction.

Enhanced stuff sacks 104 may be constructed in a wide variety of sizes and shapes. For example, enhanced stuff sacks 104 currently available through Molly Mutt, LLC, of Emeryville, Calif., generally conform to duvet covers 108 having the following sizes:
  Small (22"×27"×5");
  Medium/Large (27"×36"×5");
  Huge (36"×45"×5");
  Round (36" Diameter×5" high);
  Square (20"×20"×5"); and
  Round (20"D×5" high).

As seen in FIG. 10, one or more panels 164 and/or 166, or at least a portion thereof, comprise a porous region, wherein the stuffing materials 112 may be laundered, i.e. washed and dried, in situ. Similarly as seen in FIG. 11, one or more panels 164,166 and/or 174, or at least a portion thereof, comprise such a porous region. For example, current embodiments of the enhanced stuff sacks 104 comprise a plurality of mesh panels, such as but not limited to polyester or nylon mesh material 108, e.g. 108a (FIG. 12), such as available through Seattle Fabrics, Inc., of Seattle, Wash.

The porous panels 164,166 and or 172 allow liquids, e.g. water 266 (FIG. 15) with detergent 264 (FIG. 15) for washing, clean water 266 (FIG. 16) for rinsing, and air 304 (FIG. 17) for drying, to pass through the enhanced stuff sack 104, as well as into and through the various stuffing materials 112. One or more of the porous panels 164,166 and or 172 may preferably be flexible and/or stretchable, such as to provide a convex profile when stuffed, and/or to resist seam failure between panels 164,166 and/or 174.

Figure 12:
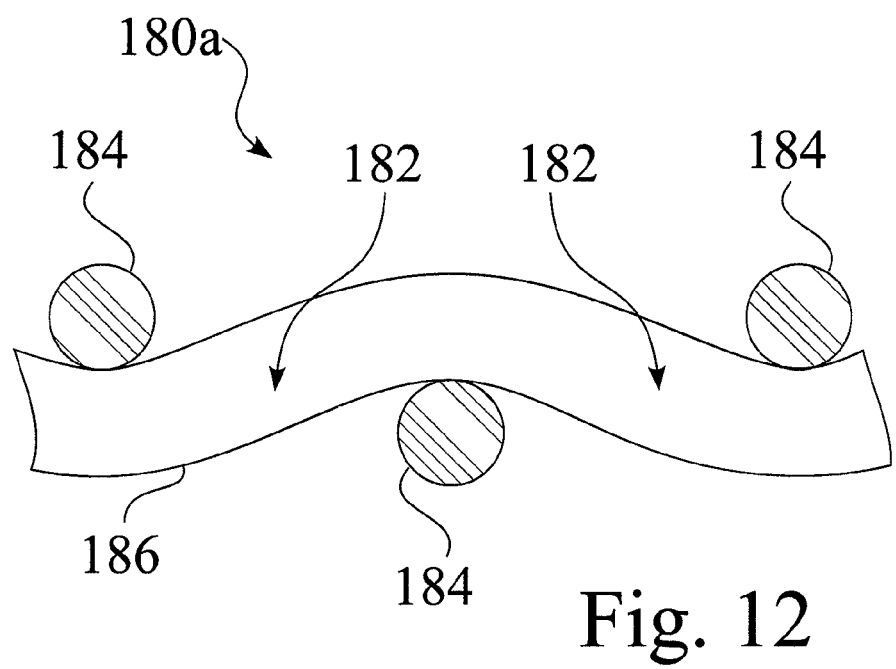
FIG. 12 is a partial cutaway view of an exemplary porous panel for a permeable stuff sack.

Permeable or Porous Materials for Enhanced Stuff Sacks. FIG. 12 is a simplified partial cutaway view of an exemplary porous material 180a for one or more panels, e.g. 164,166 and/or 172 of an enhanced permeable stuff sack 104. As seen in FIG. 12, an exemplary mesh material 180a may comprise a series of threads, fibers or filaments 184 running in a first direction, and another series of threads, fibers or filaments 186 running in a second direction, wherein the fibers provide a woven mesh structure, with holes or passages 182 defined between the intersecting fibers 184,186. The holes or passages 182 may increase in size when the enhanced stuff sack 104 is filled 130 (FIG. 7). As well, the holes or passages 182 inherently allow liquids, e.g. water with detergent, rinse water, and cool or heated air for drying, to pass through the enhanced stuff sack 104, as well as into and through the various stuffing materials 112. The size of the mesh 108a may preferably be chosen to provide adequate porosity for laundering, while suitably retaining the stuffing material 112.

Figure 13:
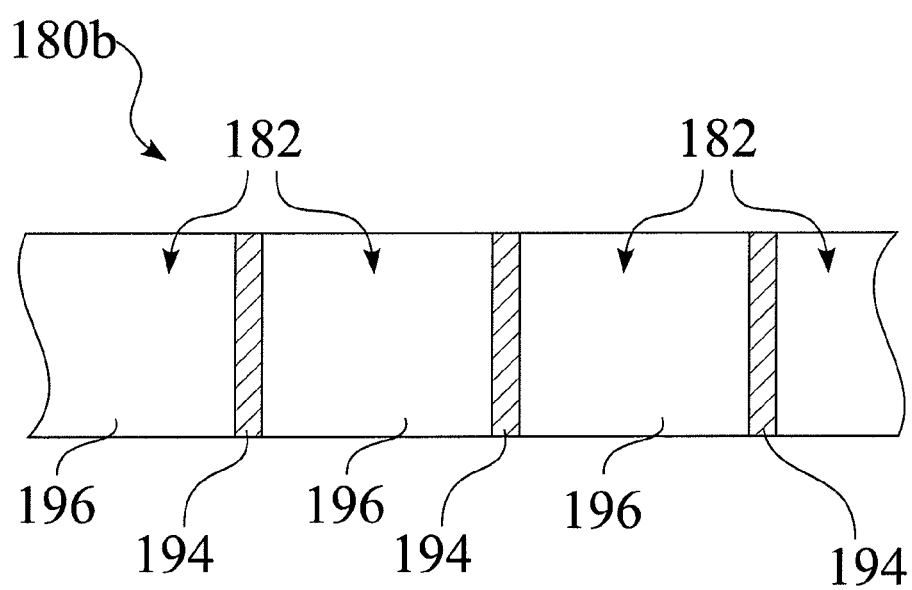
FIG. 13 is a partial cutaway view of an alternate exemplary embodiment of a porous panel for a permeable stuff sack.

FIG. 13 is a simplified partial cutaway view of an alternate exemplary porous material 180b for one or more panels, e.g. 164,166 and/or 172 of an enhanced permeable stuff sack 104. As seen in FIG. 13, an porous substrate material 180b may comprise a material substrate 194 having holes 196 defined there through, such as formed as a feature of the material itself, or as holes that are cut or otherwise formed in the material 194. Passages 182 are therefore provided through the holes, which may increase in size when the enhanced stuff sack 104 is filled 130 (FIG. 7). As well, the holes or passages 182 inherently allow liquids, e.g. water with detergent, rinse water, and cool or heated air for drying, to pass through the enhanced stuff sack 104, as well as into and through the various stuffing materials 112. The holes 196 may preferably be sized to provide adequate porosity for laundering, while suitably retaining the stuffing material 112.

Figure 14:
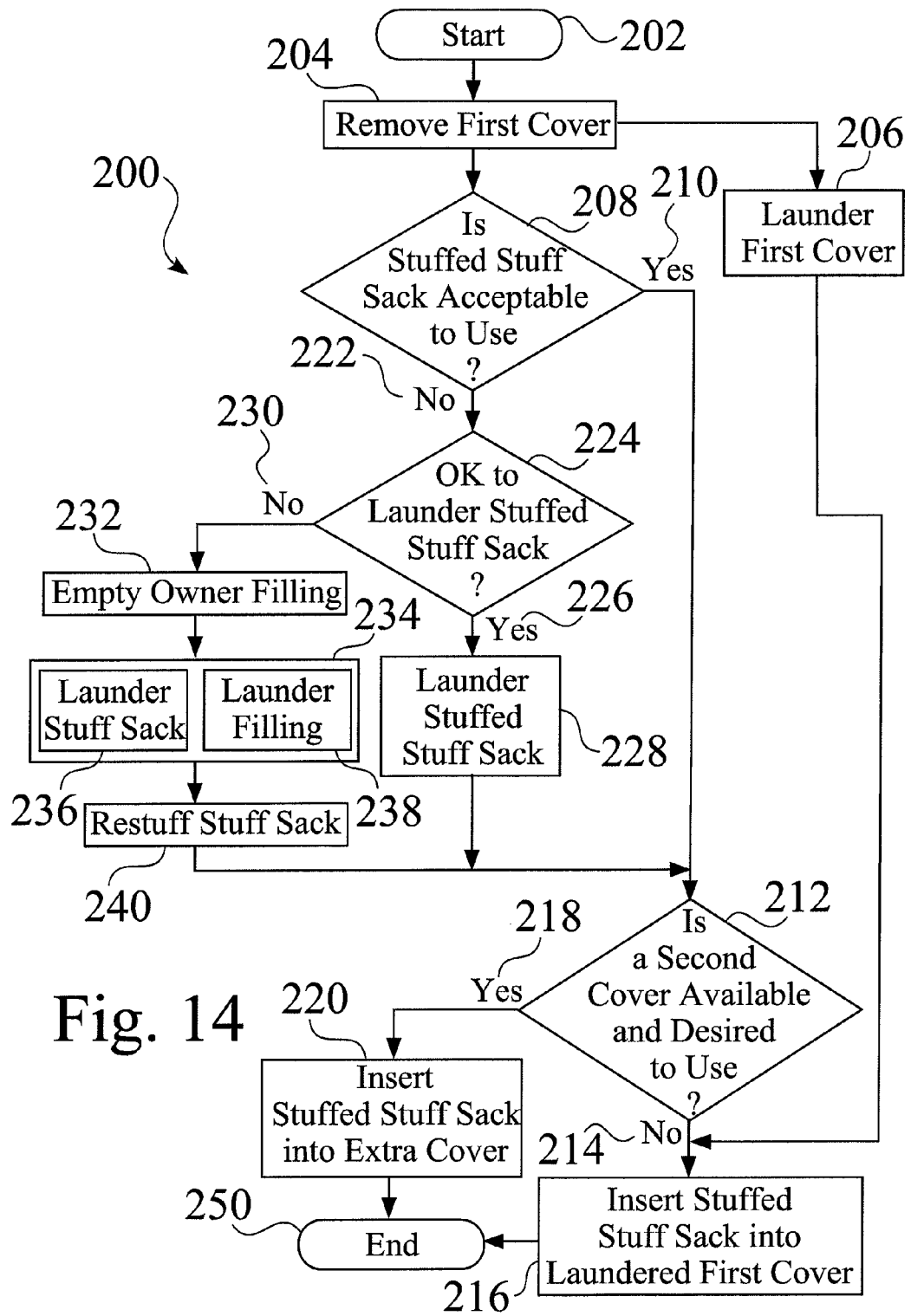
FIG. 14 is a flow diagram of a process for servicing an enhanced pet bed having a stuffed enhanced stuff sack.

Associated Process for Servicing Enhanced Bedding System. FIG. 14 is a flow diagram of an exemplary process 200 for servicing an enhanced pet bed 100 having an enhanced stuff sack 104. When the enhanced pet bed 100 is determined by the owner USR to require at least some cleaning or replacement of the current outer duvet cover 108, referred to herein as the first cover 108, the owner USR may initiate or start 202 the process 200, such as by removal 204 of the first cover 108. The user USR may then launder 206, e.g. wash and dry, the first cover, such as to reuse or to store for future use. While the owner USR may already have decided 222 that the stuffed stuff sack 104 requires cleaning, the owner may make this determination 208 once the outer duvet cover 108 is removed.

If the owner determines 208 that the stuffed stuff sack 104 is acceptable 210 to use, the owner USR may then determine 212 if a second replacement cover 108 is available and desired to use. If so 218, the owner USR inserts 220 the stuffed stuff sack 104 into the extra duvet cover 108, and places the serviced pet bed 100 into service 250. If the owner USR determines or knows 212 that a second replacement cover 108 is not available and desired to use 214, the owner USR typically completes the laundering 206 of the first cover 108, inserts 216 the stuffed stuff sack 104 into the cleaned first duvet cover 108, and places the serviced pet bed 100 back into service 250.

If the owner determines 208 that the stuffed stuff sack 104 is not acceptable 222 to use, the owner USR may then determine 224 if it is possible and/or desired 226 to launder the stuffed stuff sack 104, e.g. such as if the owner USR currently has access to a suitably sized washer 262 (FIG. 15) and/or dryer 302 (FIG. 17). If the determination 224 is positive 226, the owner may proceed to launder 228 the stuffed stuff sack 104 (either together with the outer cover 108 separate from the outer cover 108), and proceed to step 212 to insert the laundered stuffed stuff sack 104 back into an appropriate duvet cover 108 and place the serviced pet bed 100 back into service 250.

If the determination 224 is negative 230, the owner USR typically empties 232 the filling 112, launders 236 the enhanced stuff sack 104, and launders 238 the filling 112, which may typically be performed together 234. Once laundered 236,238, the owner USR then restuffs 240 the stuff sack 104 with the same stuffing, with more or less stuffing 112, or different stuffing 112, as desired. For example, the owner USR may determine that at least a portion of the prior stuffing 112 is too soiled D to be reused 240, wherein the owner USR may replace those items 112 with alternate stuffing 112. As well, the owner USR may decide to rearrange the stuffing 112 to provide a softer or firmer pet bed 100. Once the stuff sack 104 is restuffed 240, the owner USR proceeds to step 212, by inserting 216,220 the laundered stuffed stuff sack 104 back into an appropriate duvet cover 108, and placing the serviced pet bed 100 back into service 250.

FIG. 15 is a partial cutaway view of a laundry wash cycle 260 for a stuffed permeable stuff sack 104. FIG. 16 is a partial cutaway view 280 of a laundry rinse/spin cycle 280 for a stuffed permeable stuff sack 104. FIG. 17 is a partial cutaway view of a laundry drying cycle 300 for a stuffed permeable stuff sack 104.

As seen in FIG. 15, an enhanced stuff sack 104 that is stuffed 130 with stuffing 112, e.g. owner-supplied materials 112, may be washed 228, such as within a suitably sized washer 262. Detergent 264, which may also comprise any of fabric softener, bleach, and/or stain remover, is controllably mixed with water 266, as is known in the art. During the wash cycle 260, the water 266 and detergent 264 are able to pass through the passages 182 in the enhanced stuff sack 104, as well as into and through the stuffing 112, e.g. various owner supplied stuffing materials 112.

As seen in FIG. 16, an enhanced stuff sack 104 that is stuffed 130 with stuffing 112, e.g. owner supplied materials 112, may also be rinsed 280, such as within the suitably sized washer 262. During the rinse cycle 280, the rinse water 266 is able to pass through the passages 182 in the enhanced stuff sack 104, as well as into and through the stuffing 112, e.g. various owner supplied stuffing materials 112, such that the detergent 264 and wash water 264,266, as well as remaining contaminants D, are rinsed out.

As seen in FIG. 17, an enhanced stuff sack 104 that is stuffed 130 with stuffing 112, e.g. owner supplied materials 112, may also be dried 300, such as within a suitably sized dryer 302. During drying, the air 304 is able to pass through the passages 182 in the enhanced stuff sack 104, as well as through the stuffing 112, e.g. various owner supplied stuffing materials 112, such that the stuffing 112 is dried in situ, while stuffed within the enhanced stuff sack 104.

Figure 18:
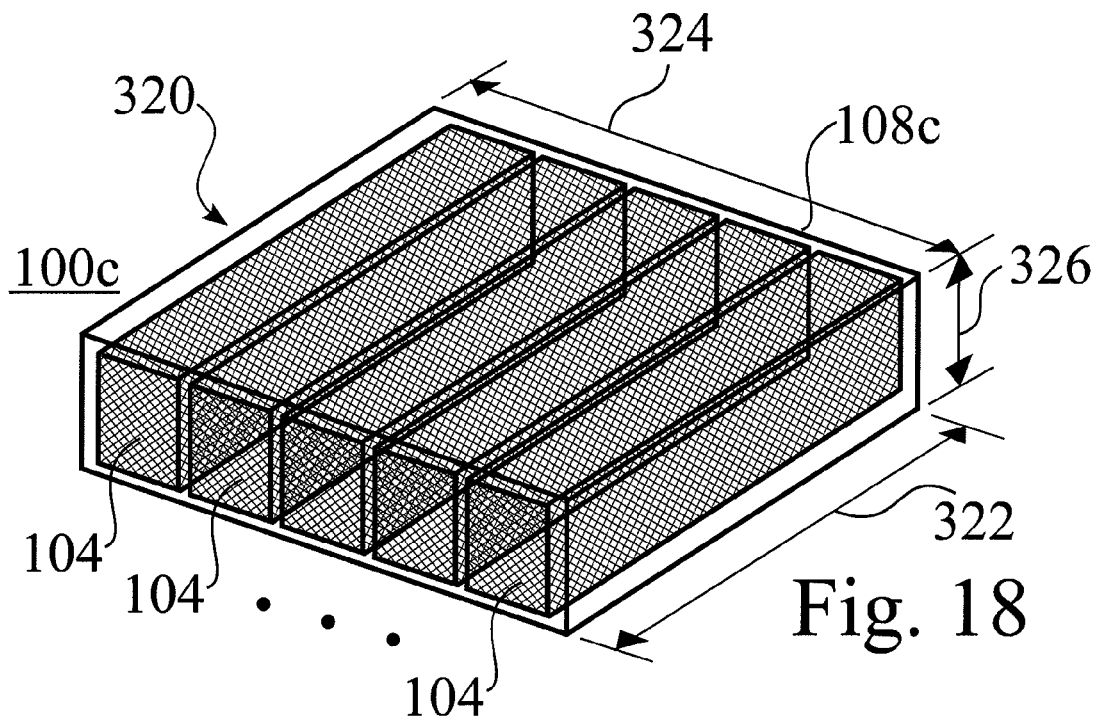
FIG. 18 is a schematic diagram of an exemplary assembled enhanced pet bed having a plurality of enhanced stuff sacks.
Figure 19:
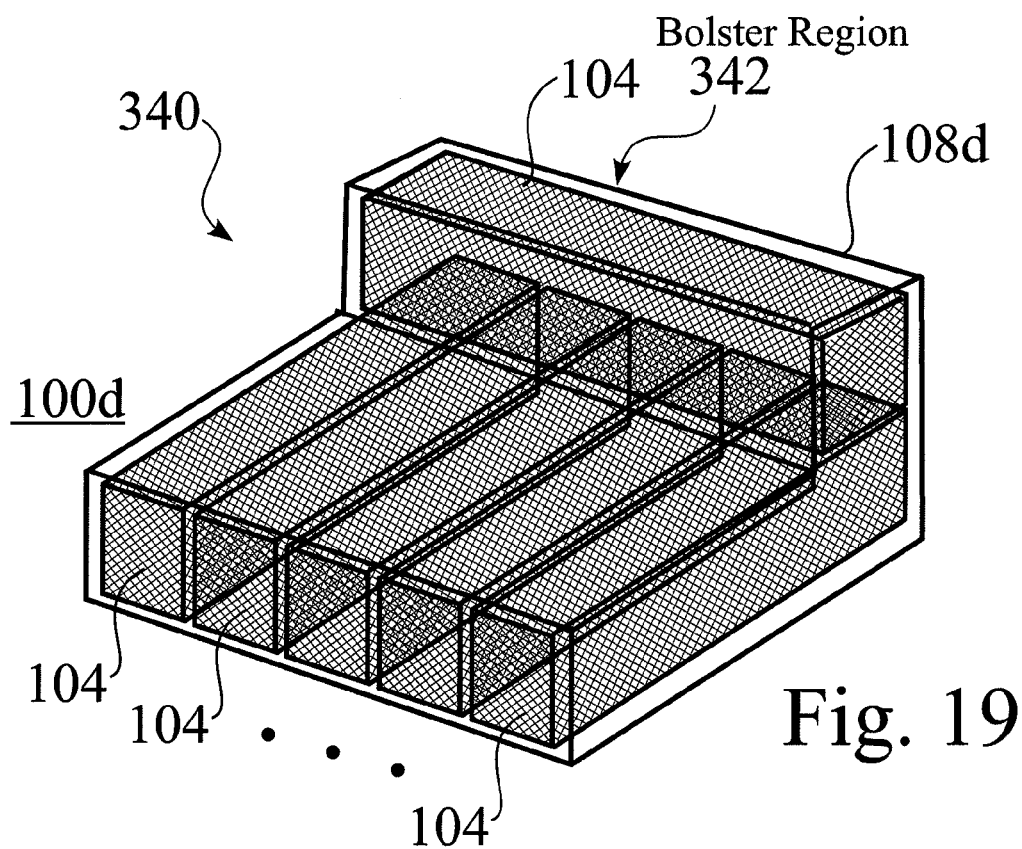
FIG. 19 is a schematic diagram of an exemplary assembled enhanced pet bed having bolstered construction and filled a plurality of enhanced stuff sacks.

Modular Embodiments of Enhanced Bedding System. FIG. 18 is a schematic diagram 320 of an exemplary assembled enhanced pet bed 100c having a plurality of enhanced stuff sacks 104. Square or rectangular enhanced dog beds 100, e.g. 100c, typically have a characteristic length 322, width 324, and height 326. FIG. 19 is a schematic diagram 340 of an exemplary assembled enhanced pet bed 100d having bolstered construction 342 and filled a plurality of enhanced stuff sacks 104. As seen in FIG. 18 and FIG. 19, the interior volume 143 of an outer pet bed duvet cover 108, e.g. 108c, 108d, may preferably be filled with a plurality of enhanced stuff sacks 104. While the shape of the enhanced stuff sacks 104 shown in FIG. 18 and FIG. 19 as generally a rectangular cube that runs throughout the length 322 of a duvet cover 108, the stuff sacks 104 may comprise one or more different shapes and lengths, such as to fill different regions within an associated duvet cover 108. In some embodiments of the enhanced pet bed system 100, a plurality of enhanced stuff sacks 104 allows easier laundering of the stuffed stuff sacks 104, such as to fit within a washer 262 and/or dryer 302 that is not sufficiently large for a single large stuffed stuff sack 104. As well, embodiments having a plurality of enhanced stuff sacks 104 allow the user USR to separably launder one or more sacks as desired, e.g. such as one stuffed stuff sack 104 that has absorbed urine D through the duvet cover 108.

As seen in FIG. 19, an outer duvet cover 108d that includes one or more bolster regions 342 may preferably be filled with a plurality of enhanced stuff sacks 104, even within the bolster region 342 itself. The outer duvet cover 108d seen in FIG. 9 may include a single inner volume 143, such as with one or more closures 142, or may include one or more defined, partition volumes 143, such as with separate closures 142 that provide access for stuff sack, installation, inspection, and removal.

Figure 20:
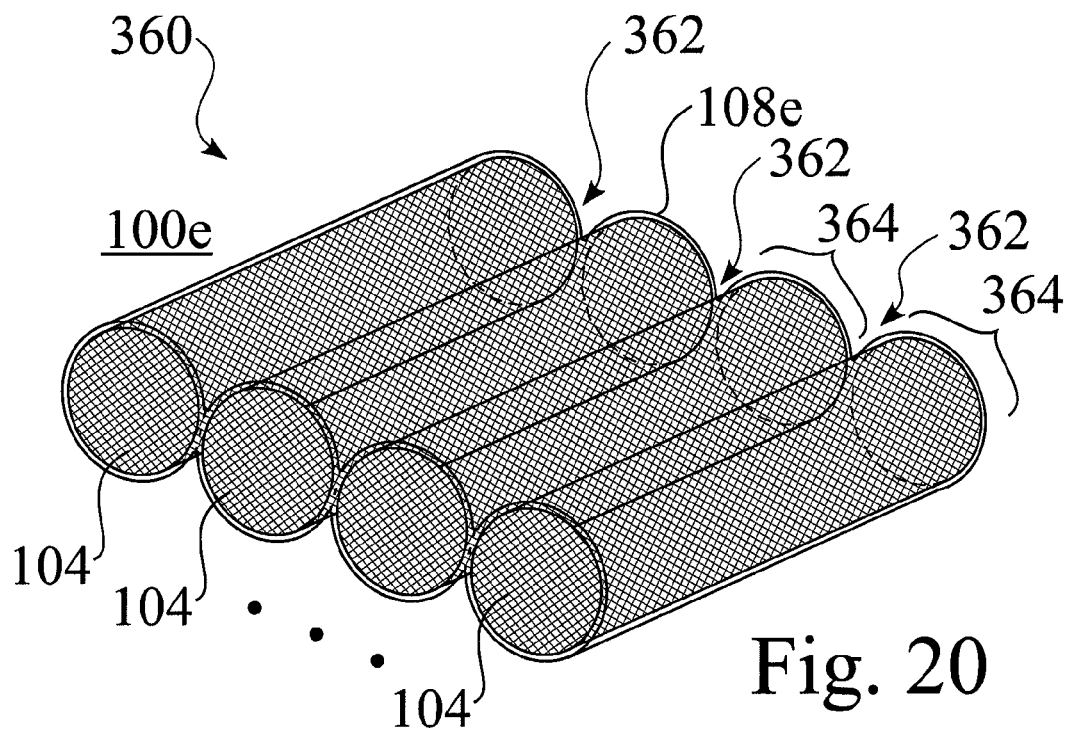
FIG. 20 is a schematic diagram of an exemplary assembled enhanced pet bed having pleated construction and filled a plurality of enhanced stuff sacks.

FIG. 20 is a schematic diagram 360 of an exemplary assembled enhanced pet bed 100e having pleated construction and filled a plurality of enhanced stuff sacks 104. For example, pleats 364 may preferably be formed, such as by one or more seams 362, wherein partitions are formed within the interior 143 of the duvet cover 108e. such as for any of exterior design or controlled interior spacing for a plurality of enhanced stuff sacks 104.

Figure 21:
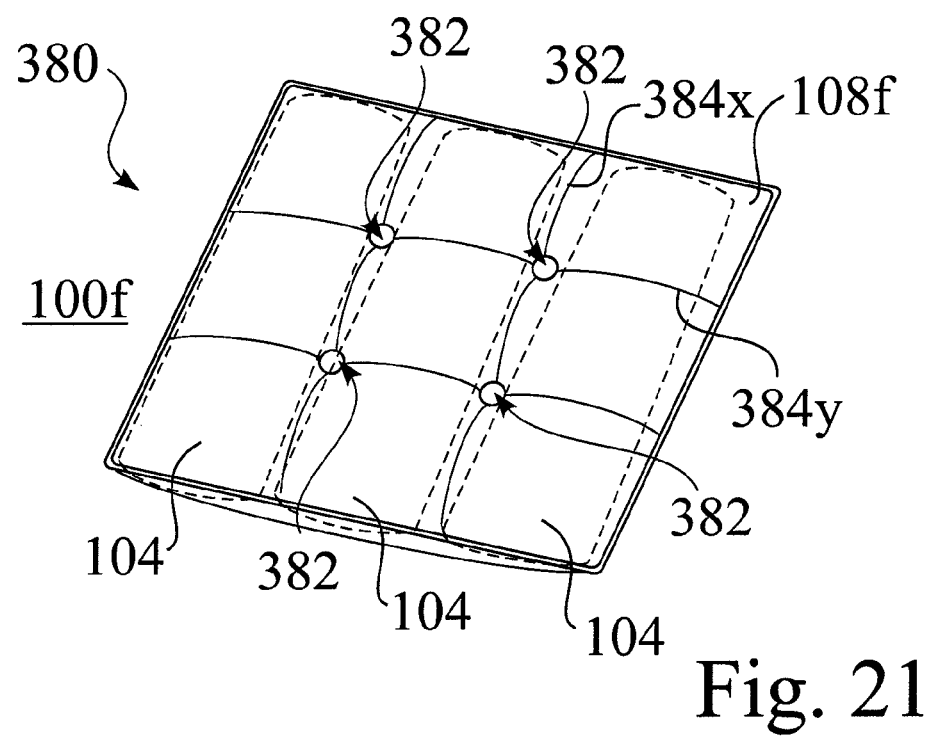
FIG. 21 is a schematic diagram of an exemplary assembled enhanced pet bed having tufted construction and filled a plurality of enhanced stuff sacks.

FIG. 21 is a schematic diagram 380 of an exemplary assembled enhanced pet bed 100f having tufted or quilted construction and filled a plurality of enhanced stuff sacks 104. For example, the addition of one or more buttons 382 may preferably provide connections between the upper panel 146a and the lower panel 146b of the outer duvet cover 108f, wherein partitions are formed within the interior 143 of the duvet cover 108f, such as for any of exterior design or controlled interior spacing for a plurality of enhanced stuff sacks 104.

While the enhanced pet bed system 100 and methods of use are described herein in connection with pet beds 100, the permeable stuff sack 104 is not necessarily limited to a providing a formed cushion for a pet bed 100, such as for a dog or cat, but can also be used for a wide variety of upholstered items such as for furniture cushions, throw pillows, and/or casual or temporary seating.

Figure 22:
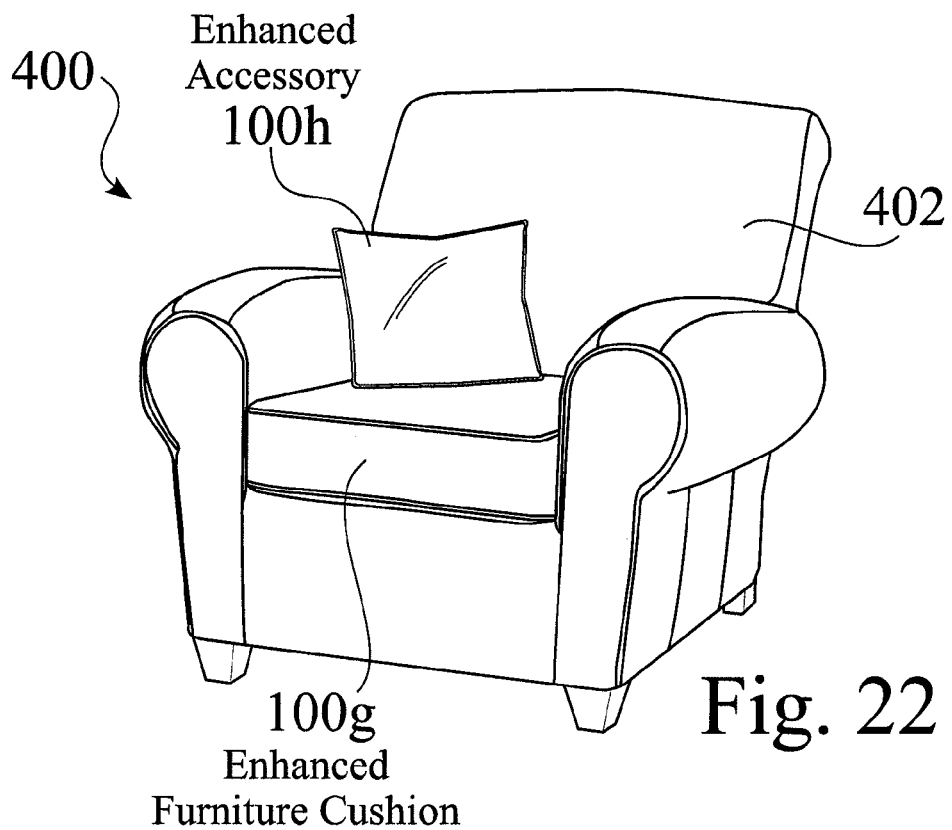
FIG. 22 shows a furniture cushion and an accessory having enhanced stuff sacks.

FIG. 22 is a schematic depiction 400 of a furniture cushion 100g and an accessory 100h, e.g. a throw pillow 100h, having enhanced stuff sacks 104. While the exemplary enhanced pet bed system 100 disclosed herein has been described primary as a pet bed system 100, the unique structures and inherent ecological advantages can similarly be employed for a wide variety of applications, such as comprising all or part of human-based furniture structures or accessories. While FIG. 22 shows a cushion 100g and accessory 100h for a somewhat conventional piece of furniture 402, similar structures may suitably provide utility for users USR, such as but not limited to temporary cushions for portable living, recreation, e.g. hiking or bike touring, and/or for emergency accommodations, wherein the user USR may readily use the enhanced stuff sacks 104 to store any stuffing 112, e.g. such as clean and/or dirty laundry, while also using the enhanced stuff sack within a cover 108 for sitting or sleeping.

Figure 23:
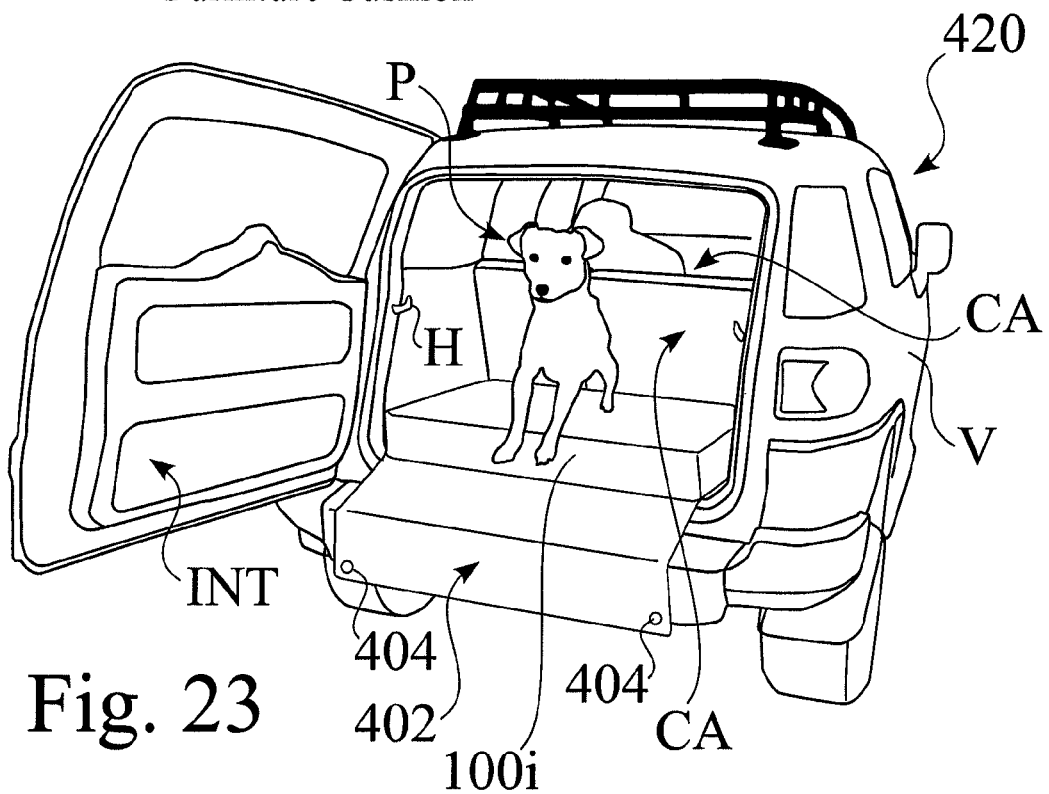
FIG. 23 shows an alternate embodiment of enhanced pet bed within a vehicle.

FIG. 23 shows 420 an alternate embodiment of enhanced pet bed 100i within a vehicle V, such as within a cargo area CA or passenger area PA. As seen in FIG. 23, the enhanced pet bed system 100 may readily be adapted to provide enhanced functionality, wherein the outer cover 108 further comprises an extended section 402, that provides protection for the vehicle V as the pet enters or exits the vehicle V, such as by covering the bumper B. While the extended section 402 may comprise a similar material to the other panels of the outer cover 108, the extended section 402 may alternately comprise a different material or substrate, such as to aid in traction for the pet P. As also seen in FIG. 23, the extended section 402 may additionally comprise a means 404 for connection to the vehicle V, such as grommet holes 404 that mate to corresponding accessory hooks H in the vehicle V. The grommets 404 may preferably store the extended section 402 upward when not used for ingress or egress, while also protecting the interior panels, seats or upholstery INT from damage caused by the pet P, or accumulation of pet hair and/or contamination D, while being transported or parked.

While many embodiments of the enhanced pet bed 100 may initially be constructed, such as by the owner or handler USR, to include user-supplied materials 112 that may preferably also include a scent 114 of a person or animal that is familiar to the intended pet P, it may also be beneficial to provide a protective layer, such as a moisture barrier, between the outer duvet cover 108 and the enhanced stuff sack 104, such to prevent absorption of urine and/or other liquids D that the pet P may track in, such as water or mud, e.g. during times of inclement weather. Based upon any of age, behavior, training, or health, many animals may accidentally or intentionally urinate on their own pet bed or on a pet bed designated for another pet P.

Figure 24:
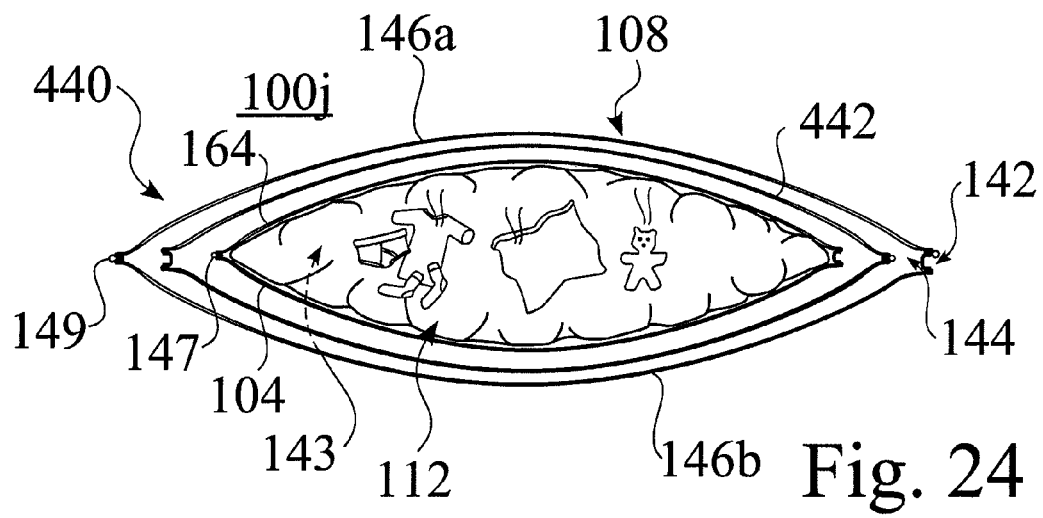
FIG. 24 is an alternate embodiment of an enhanced pet bed having an intermediate protective cover.

FIG. 24 is a schematic illustration 440 of an alternate embodiment of an enhanced pet bed 100j having an intermediate moisture resistant cover 442, such as but not limited to a water resistant fabric cover having a zipped closure, or a petLINENS™ waterproof/breathable cover, such as available through Domesticated Designs LLC, of Orinda, Calif.

Figure 25:
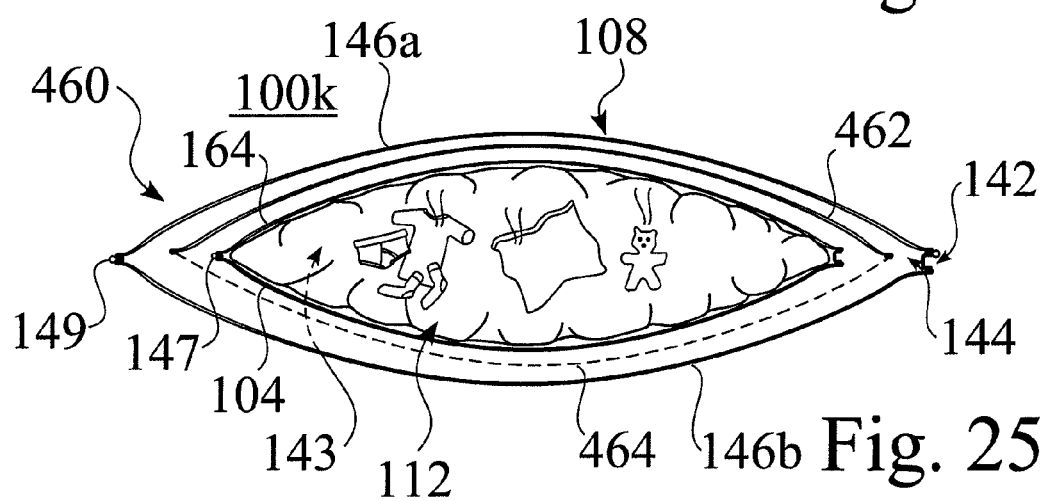
FIG. 25 is an alternate embodiment of an enhanced pet bed having a protective moisture-resistant layer located on the upper side of the enhanced stuff sack.

FIG. 25 is a schematic illustration 460 of an enhanced pet bed 100k having a moisture resistant layer 462 generally located between the upper panel 164 of the enhanced stuff sack 104 and the upper panel 146a of the outer duvet cover 108. In the exemplary embodiment seen in FIG. 25, the moisture resistant layer 462 comprises a mechanism 464 for attaching or otherwise positioning the moisture resistant layer 462 as desired within the interior 143 of the outer duvet cover 104. For example, the attachment mechanism 464 may comprise any of one or more elastic bands that stretch around the enhanced stuff sack 104 or around opposing corners of the enhanced stuff sack 104. As well, the attachment mechanism 464 may alternately comprise an elastic band sewn or otherwise attached the periphery of the moisture resistant layer 462, wherein the moisture barrier 462 may be tucked around the enhanced stuff sack 104.

Figure 26:
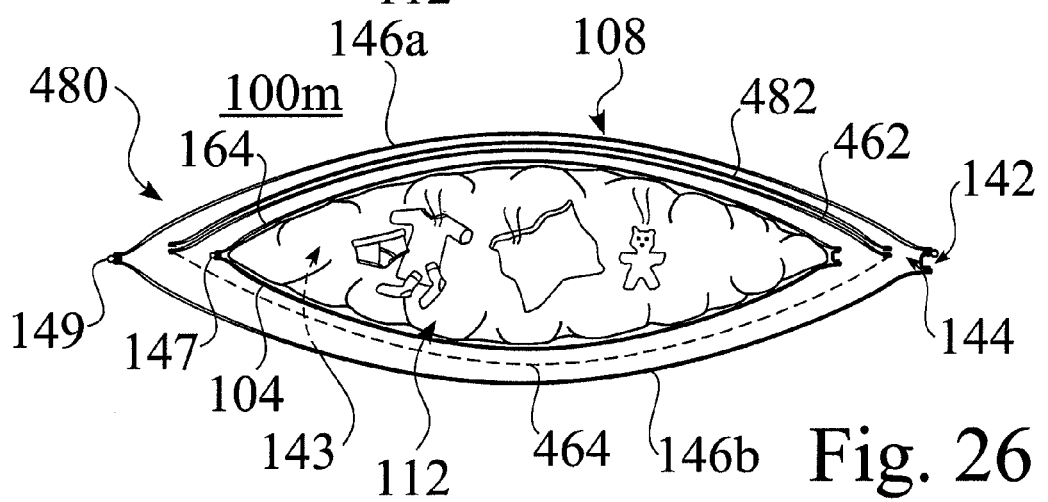
FIG. 26 is an alternate embodiment of an enhanced pet bed having a moisture resistant layer located on the upper side of the enhanced stuff sack, and a moisture absorbent layer between the moisture resistant layer and the upper panel of the outer duvet cover.

FIG. 26 is an alternate embodiment of an enhanced pet bed 100m having a moisture resistant layer 462 located on the upper side 164 of the enhanced stuff sack 104, and an absorbent layer 482 between the moisture resistant layer and the upper panel of the outer duvet cover 104, wherein the absorbent layer may be disposable, or may be launderable, such as within the same washer or dryer load as other components of the enhanced pet bed 100m.

Although the enhanced pet bed system and methods of use are described herein in connection with pet beds for a residential environment, the structures and techniques can be implemented for a wide variety of applications and environments, or any combination thereof, as desired.

For example, an alternate pet bed system can be provided for vehicular, portable and/or transient environments. For instance, a portable pet bed can readily be made for either the owners or their pets, using any combination of common items, such as but not limited to the user's clean or dirty laundry.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A pet bed structure for a pet having any of an owner or handler associated therewith, comprising:
  an outer cover having a cover closure and a defined inner volume;
  an inner stuff sack located within the inner volume of the outer cover, wherein the inner stuff sack comprises
    one or more material panels that define an inner stuffing volume, wherein one or more of the material panels comprise a mesh having a plurality of holes defined therethrough,
    and
    a sack closure for any of adding or removing stuffing to the inner stuffing volume; and
  stuffing material located within the inner stuff sack, wherein at least a portion of the stuffing material is supplied by the owner or handler and comprises a scent of any of a person that is known to the pet or an animal that is known to the pet;
  wherein the outer cover is removable from the inner stuff sack;
  wherein the size of the mesh is configured to provide in situ launderability of the stuffing when the stuffing is located within the inner stuff sack.

2. The pet bed structure of claim 1, wherein at least one of the panels comprises any of nylon or polyester.

3. The pet bed structure of claim 1, further comprising:
  any of labeling, instructions, a web site, or a telephone number to instruct the user how to construct the pet bed structure with the stuffing, and how to launder the stuffing and inner stuff sack when the stuffing is located within the inner stuff sack.

4. The pet bed structure of claim 1, wherein the cover closure of the outer cover comprises any of a zipper, buttons, ties, and an opposing hook and loop structure.

5. The pet bed structure of claim 1, wherein at least a portion of the outer cover is any of stain resistant, moisture resistant, or waterproof.

6. The pet bed structure of claim 1, wherein the scent is desirable or comforting to the pet.

7. The pet bed structure of claim 1, wherein at least a portion of the stuffing material comprises any of clothes, blankets, stuffed toys, pillows, or polyester fill.

8. The pet bed structure of claim 1, wherein at least a portion of the stuffing material comprises one or more of any of recycled, repurposed or upcycled items.

9. The pet bed structure of claim 1, further comprising:
one or more protective layers between at least a portion of the inner stuff sack and at least a portion of the outer cover, wherein the protective layer comprises any of moisture-resistant layer, a waterproof layer, and an absorbent layer.

10. A pet bed structure for a pet having any of an owner or handler associated therewith, wherein the pet bed structure is locatable within an inner volume of an outer cover, and wherein the pet bed structure comprises:
a stuff sack cover comprising
one or more material panels that define an inner stuffing volume, wherein one or more of the material panels comprise a mesh having a plurality of holes defined therethrough, and
a sack closure for any of adding or removing stuffing to the inner stuffing volume; and
stuffing material located within the inner stuff sack, wherein at least a portion of the stuffing material is supplied by the owner or handler and comprises a scent of any of a person that is known to the pet or an animal that is known to the pet;
wherein the size of the mesh is configured to provide in situ launderability of the stuffing when the stuffing is retained within the inner stuffing volume of the stuff sack cover.

11. The pet bed structure of claim 10, wherein at least one of the panels comprises any of nylon or polyester.

12. The pet bed structure of claim 10, further comprising:
any of labeling, instructions, a web site, or a telephone number to instruct the user how to construct the pet bed structure with the stuffing, and how to launder the stuffing and inner stuff sack when the stuffing is located within the inner stuff sack.

13. The pet bed structure of claim 10, wherein the closure comprises any of a zipper, buttons, ties, or an opposing hook and loop structure.

14. The pet bed structure of claim 10, wherein at least a portion of the stuffing material comprises any of clothes, blankets, pillows, stuffed toys, pillows, or poly fill.

15. The pet bed structure of claim 10, wherein at least a portion of the stuffing material comprises one or more of any of recycled, repurposed or upcycled items.

16. The pet bed structure of claim 10, wherein the scent is desirable or comforting to the pet.

17. The pet bed structure of claim 10, further comprising:
a first protective layer that is attachable to the stuff sack cover, wherein the protective layer comprises any of moisture-resistant layer or a waterproof layer.

18. The pet bed structure of claim 17, further comprising:
a second protective layer that is attachable to the first protective layer, wherein the second protective layer comprises an absorbent layer.

19. The pet bed structure of claim 10, wherein the in situ launderability comprises washability, rinsability, and dryability of the stuffing while the stuffing is retained within the inner stuffing volume of the stuff sack cover, wherein the mesh is configured to allow liquids and air to pass through the inner stuff sack, and into and through the stuffing.

20. The pet bed structure of claim 1, wherein the in situ launderability comprises washability, rinsability, and dryability of the stuffing while the stuffing is retained within the inner stuffing volume of the stuff sack cover, wherein the mesh is configured to allow liquids and air to pass through the inner stuff sack, and into and through the stuffing.

21. A process, comprising the steps of:
providing a kit for a pet bed structure for a pet having any of an owner or handler associated therewith, the kit comprising
an outer cover having a cover closure and a defined inner volume,
an inner stuff sack located within the inner volume of the outer cover, wherein the inner stuff sack comprises
one or more material panels that define an inner stuffing volume, wherein one or more of the material panels comprise a mesh having a plurality of holes defined therethrough, and
a sack closure for any of adding or removing stuffing to the inner stuffing volume, and
any of labeling, instructions, a web site, or a telephone number to instruct a user how to construct the pet bed structure by filling the inner stuff sack with stuffing material, wherein at least a portion of the stuffing material is to be supplied by the owner or handler and comprises a scent of any of a person that is known to the pet or an animal that is known to the pet;
wherein the outer cover is removable from the inner stuff sack; and
wherein the size of the mesh is configured to provide in situ launderability of the stuffing when the stuffing is located within the inner stuff sack.

22. The process of claim 21, further comprising the steps of:
constructing the pet bed structure based upon the instructions, wherein the user fills the inner stuff sack with stuffing material, wherein at least a portion of the stuffing material is supplied by the owner or handler and comprises a scent of any of a person that is known to the pet or an animal that is known to the pet;
closing the sack closure of the inner stuff sack;
closing the outer cover; and
placing the bed into service with the intended animal.

23. The process of claim 22, further comprising the steps of:
removing the stuffed inner stuff sack from the outer cover;
placing the stuffed inner stuff sack into a washing machine; and
washing the stuffed stuff sack in the washing machine;
wherein the stuffing located within the inner stuff sack is readily washed clean, rinsed, and spun in the washer, based on the configured size of the mesh.

24. The process of claim 23, further comprising the steps of:
removing the washed stuffed stuff sack from the washer;
placing the stuffed stuff sack into a laundry dryer;
drying the washed and cleaned stuff sack in the dryer, wherein the dryer air readily flows through the washed and cleaned stuff sack;
removing the dried, washed clean stuffed stuff sack from the dryer;
replacing the stuff sack into the any of the outer cover or another outer cover; and
placing the pet bed structure back into service.

25. The process of claim 22, wherein the portion of the stuffing material that comprises the scent is configured to be any of desirable or comforting to the pet.

26. The process of claim 21, wherein the size of the kit without the stuffing provides any of economical distribution, ease of purchase, or ease of transportation.

27. The process of claim 21, wherein the outer cover comprises a first outer cover having a specified size, and wherein the first outer cover is replaceable by a second outer cover having the same specified size as the first outer cover.

* * * * *